United States Patent
Whipple et al.

(10) Patent No.: US 11,065,953 B1
(45) Date of Patent: *Jul. 20, 2021

(54) METHOD AND SYSTEM FOR FORMING A SELF-SEALING VOLUME USING A BREATHER SYSTEM

(71) Applicant: ROBERTSON FUEL SYSTEMS LLC, Tempe, AZ (US)

(72) Inventors: Matthew Whipple, Tempe, AZ (US); Ruben Lopez, Tempe, AZ (US); Davis Lee, Tempe, AZ (US)

(73) Assignee: ROBERTSON FUEL SYSTEMS, L.L.C., Tempe, AZ (US)

( * ) Notice: Subject to any disclaimer, the term of this patent is extended or adjusted under 35 U.S.C. 154(b) by 470 days.

This patent is subject to a terminal disclaimer.

(21) Appl. No.: 15/791,478

(22) Filed: Oct. 24, 2017

Related U.S. Application Data

(63) Continuation of application No. 14/176,012, filed on Feb. 7, 2014, now Pat. No. 9,802,476, and a
(Continued)

(51) Int. Cl.
*B29C 49/02* (2006.01)
*B60K 15/03* (2006.01)
(Continued)

(52) U.S. Cl.
CPC .......... *B60K 15/03* (2013.01); *B29C 49/0005* (2013.01); *B29C 49/02* (2013.01); *B29C 49/22* (2013.01); *B29C 49/28* (2013.01); *B32B 5/02* (2013.01); *B32B 25/20* (2013.01); *B32B 27/36* (2013.01); *B32B 27/38* (2013.01); *B32B 27/40* (2013.01); *B29C 2049/026* (2013.01); *B29K 2075/00* (2013.01); *B29K 2077/00* (2013.01); *B29L 2009/005* (2013.01);
(Continued)

(58) Field of Classification Search
None
See application file for complete search history.

(56) References Cited

U.S. PATENT DOCUMENTS 2,439,366 A  4/1948  McLaughlin
2,440,965 A  5/1948  Merill et al.
(Continued)

FOREIGN PATENT DOCUMENTS

WO   WO1992-011186 A1   7/1992

*Primary Examiner* — Monica A Huson
(74) *Attorney, Agent, or Firm* — Smith Tempel; Steven P. Wigmore

(57) ABSTRACT

A fabric and elastomeric material (referred to as a fabric trilayer) combined with a sealant may be applied in such a fashion so as to eliminate or minimize air entrapment in an elastomeric composite structure that forms a seal-sealing volume. The performance of the self-sealing volume is dramatically improved with this minimizing of air entrapment. Surprisingly and unexpectedly, this construction approach may be accomplished without significantly adding to the weight or thickness of the volume and without affecting the outer dimension of the self-sealing volume. Thus, a method and system for forming a self-sealing volume are described. The system includes an elastomeric composite structure comprising at least one layer of an elastomeric material derived from a neat (no solvent) elastomeric material that does not substantially react at room temperature.

20 Claims, 23 Drawing Sheets

FIG. 2E

Related U.S. Application Data continuation-in-part of application No. 13/796,775, filed on Mar. 12, 2013, now abandoned.

(51) Int. Cl.

| | |
|---|---|
| *B32B 25/20* | (2006.01) |
| *B32B 27/38* | (2006.01) |
| *B32B 27/36* | (2006.01) |
| *B32B 27/40* | (2006.01) |
| *B32B 5/02* | (2006.01) |
| *B29C 49/00* | (2006.01) |
| *B29C 49/28* | (2006.01) |
| *B29C 49/22* | (2006.01) |
| *B29L 22/02* | (2006.01) |
| *B29L 9/00* | (2006.01) |
| *B29L 31/00* | (2006.01) |
| *B29K 77/00* | (2006.01) |
| *B29K 75/00* | (2006.01) |

(52) U.S. Cl.
CPC ... *B29L 2022/02* (2013.01); *B29L 2031/7172* (2013.01); *B32B 2250/04* (2013.01); *B32B 2307/762* (2013.01); *B32B 2439/40* (2013.01); *B60K 15/03177* (2013.01); *B60K 2015/03046* (2013.01); *B60K 2015/03447* (2013.01); *B60K 2015/03493* (2013.01)

(56) References Cited

U.S. PATENT DOCUMENTS

| | | | |
|---|---|---|---|
| 2,446,811 A | 8/1948 | Crawford | |
| 2,446,815 A | 8/1948 | Davies et al. | |
| 2,497,123 A | 2/1950 | Frolich | |
| 2,626,882 A | 1/1953 | Gerke | |
| 2,657,151 A | 10/1953 | Gensel et al. | |
| 2,687,976 A | 8/1954 | Gerke | |
| 2,687,977 A | 8/1954 | Gerke | |
| 2,802,763 A | 8/1957 | Freedlander | |
| 2,965,615 A | 12/1960 | Tess | |
| 2,987,977 A | 6/1961 | Bretthauer et al. | |
| 2,992,957 A | 7/1961 | Maxey | |
| 3,068,132 A | 12/1962 | Warburton | |
| 3,449,189 A | 6/1969 | Hatch | |
| 3,506,224 A | 4/1970 | Harr et al. | |
| 3,509,016 A | 4/1970 | Wickersham, Jr. et al. | |
| 3,526,580 A | 9/1970 | Taylor et al. | |
| 3,563,846 A | 2/1971 | Harr | |
| 3,567,536 A | 3/1971 | Wickersham | |
| 3,577,314 A | 5/1971 | Evans | |
| 3,587,914 A | 6/1971 | Jennings et al. | |
| 3,664,904 A | 5/1972 | Cook | |
| 3,692,742 A | 9/1972 | Underwood | |
| 3,698,587 A | 10/1972 | Baker et al. | |
| 3,772,071 A | 11/1973 | Harr | |
| 3,779,420 A | 12/1973 | Knaus | |
| 3,787,279 A | 1/1974 | Winchester | |
| 3,801,425 A | 4/1974 | Cook | |
| 3,916,060 A | 10/1975 | Fish et al. | |
| 3,951,190 A | 4/1976 | Suter et al. | |
| 4,050,358 A | 9/1977 | Humberstone et al. | |
| 4,125,526 A | 11/1978 | McCready | |
| 4,146,667 A | 3/1979 | Stannard | |
| 4,149,921 A | 4/1979 | Stannard | |
| 4,247,678 A | 1/1981 | Chung et al. | |
| 4,326,573 A | 4/1982 | Brown et al. | |
| 4,368,086 A | 1/1983 | Villemain | |
| 4,434,021 A | 2/1984 | Robinson et al. | |
| 4,434,201 A | 2/1984 | Humphreys | |
| 4,435,240 A | 3/1984 | Knaus et al. | |
| 4,482,586 A | 11/1984 | Smith | B29C 49/22 215/12.2 |
| 4,487,913 A | 12/1984 | Chung et al. | |
| 4,565,729 A | 1/1986 | Liggett et al. | |
| 4,622,091 A | 11/1986 | Letterman et al. | |
| 4,668,535 A | 5/1987 | Liggett et al. | |
| 4,689,385 A | 8/1987 | MacPhee et al. | |
| 4,910,265 A | 3/1990 | Matsumura et al. | |
| 5,001,208 A | 3/1991 | Ross et al. | |
| 5,045,386 A | 9/1991 | Stan et al. | |
| 5,047,495 A | 9/1991 | Kolycheck | |
| 5,122,318 A | 6/1992 | Bonet | |
| 5,194,212 A | 3/1993 | Bonnett et al. | |
| 5,242,651 A | 9/1993 | Brayden | |
| 5,298,303 A | 3/1994 | Kerr et al. | |
| 5,366,684 A | 11/1994 | Corneau et al. | |
| 5,387,455 A | 2/1995 | Horsch | |
| 5,499,743 A | 3/1996 | Blumenkron | |
| 5,725,940 A | 3/1998 | Sakai et al. | |
| 5,928,745 A | 7/1999 | Wood et al. | |
| 5,961,764 A | 10/1999 | Sydow et al. | |
| 6,090,465 A | 7/2000 | Steele et al. | |
| 6,429,157 B1 | 8/2002 | Kishi et al. | |
| 6,915,861 B2 | 7/2005 | Goodworth et al. | |
| 7,213,970 B1 | 5/2007 | Reicin et al. | |
| 7,259,115 B2 | 8/2007 | Panse | |
| 7,288,307 B2 | 10/2007 | Bhatnagar et al. | |
| 7,824,770 B2 | 11/2010 | Honma et al. | |
| 7,858,016 B2 | 12/2010 | Van Schaftingen et al. | |
| 7,861,884 B2 | 1/2011 | Childress et al. | |
| 9,802,476 B1 * | 10/2017 | Whipple | B60K 15/03 |
| 2003/0224235 A1 | 12/2003 | Park et al. | |
| 2004/0040640 A1 | 3/2004 | Bordes | |
| 2005/0025929 A1 | 2/2005 | Smith et al. | |
| 2006/0165932 A1 | 7/2006 | Hromadkova et al. | |
| 2006/0234097 A1 | 10/2006 | Boehm et al. | |
| 2006/0266472 A1 | 11/2006 | Kipp et al. | |
| 2012/0003463 A1 | 1/2012 | Dry | B29C 73/22 428/305.5 |

\* cited by examiner

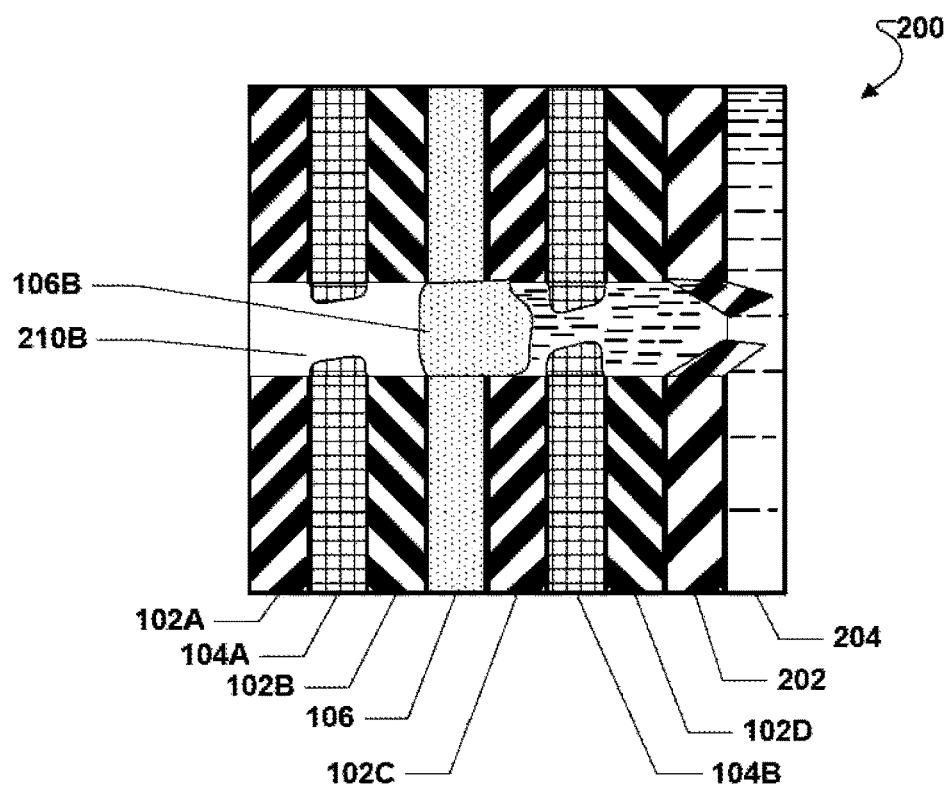
FIG. 2F
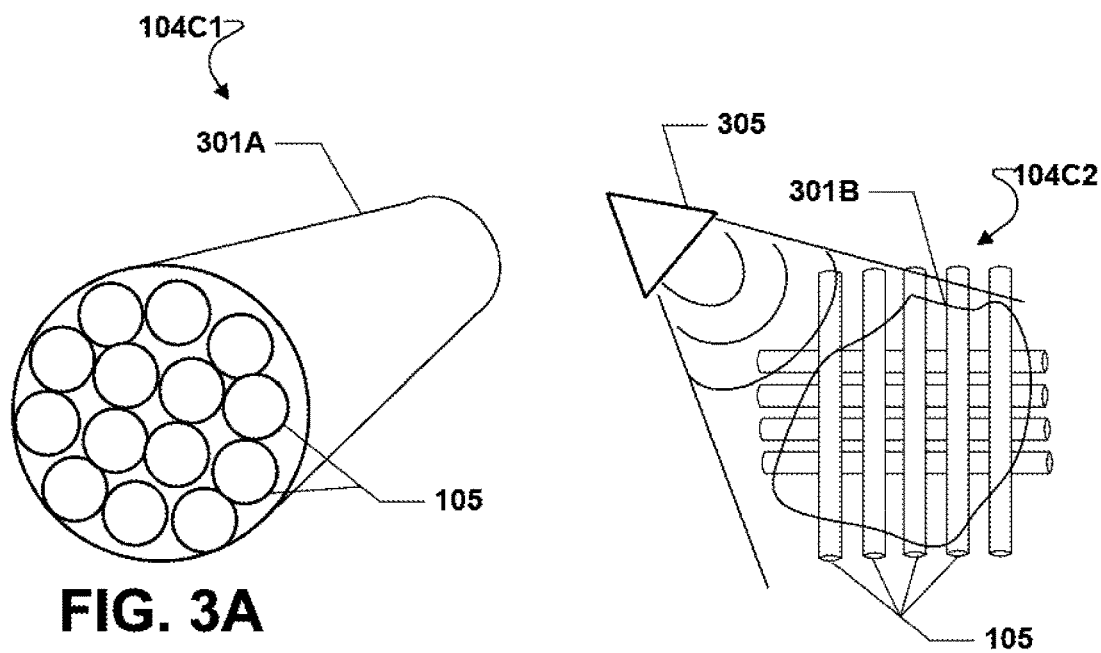
FIG. 3A
FIG. 3B

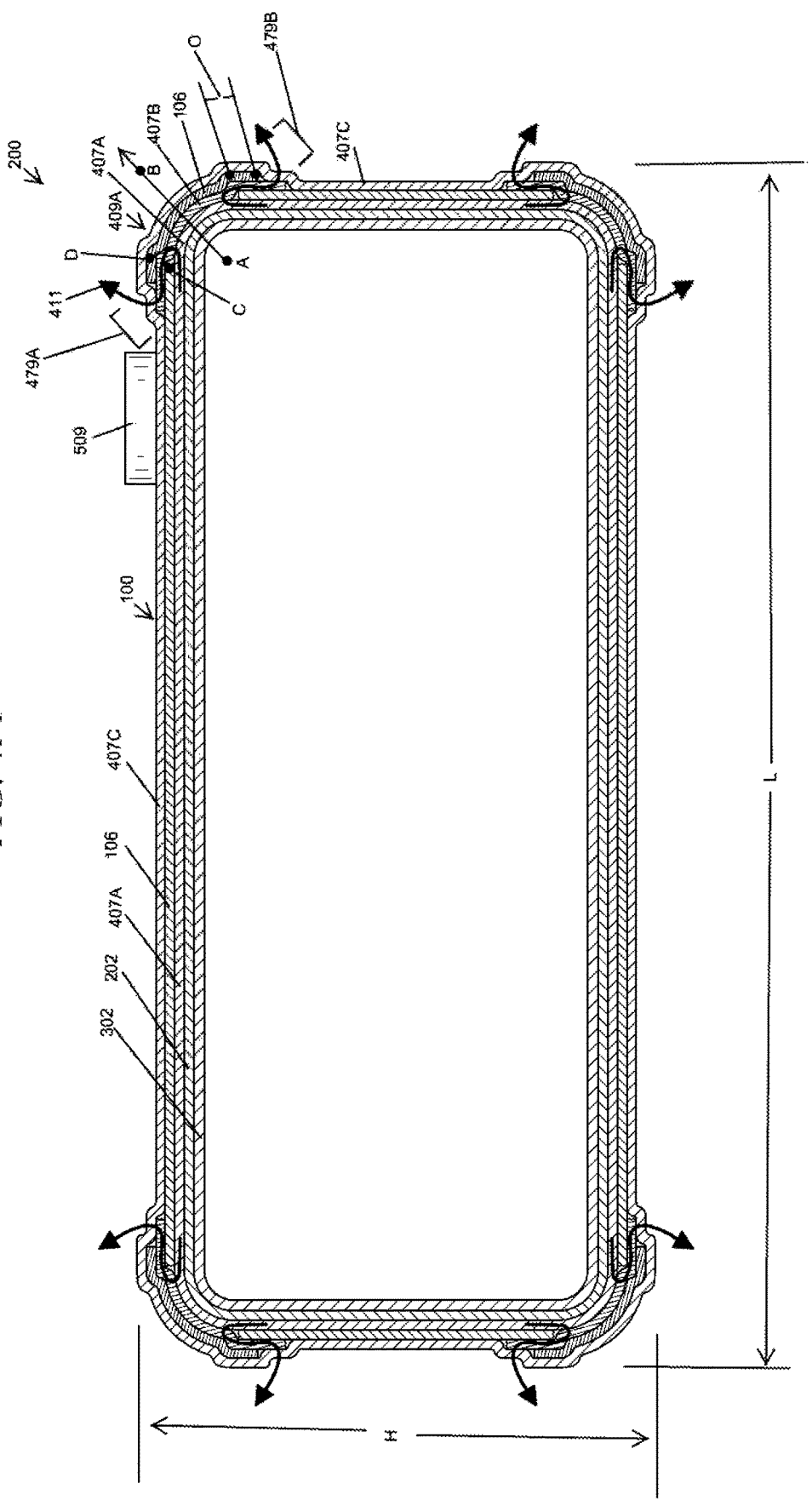
FIG. 4F1

FIG. 4F2

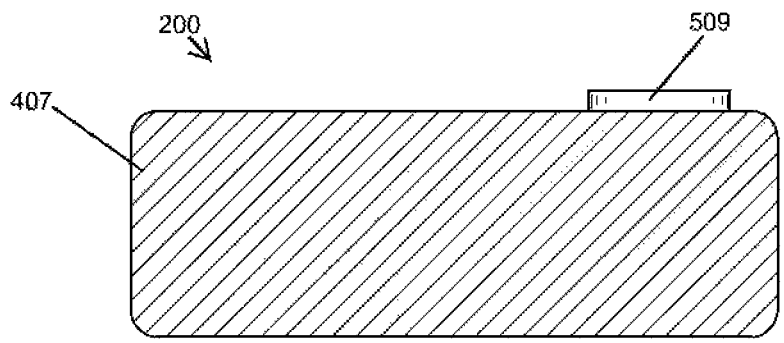
Fig. 4J1
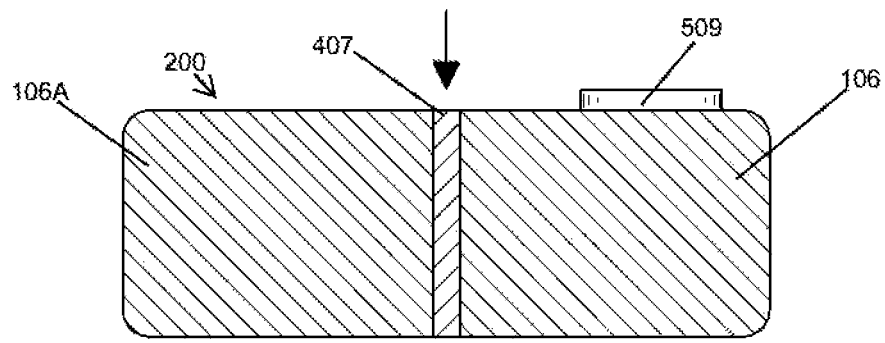
Fig. 4J2
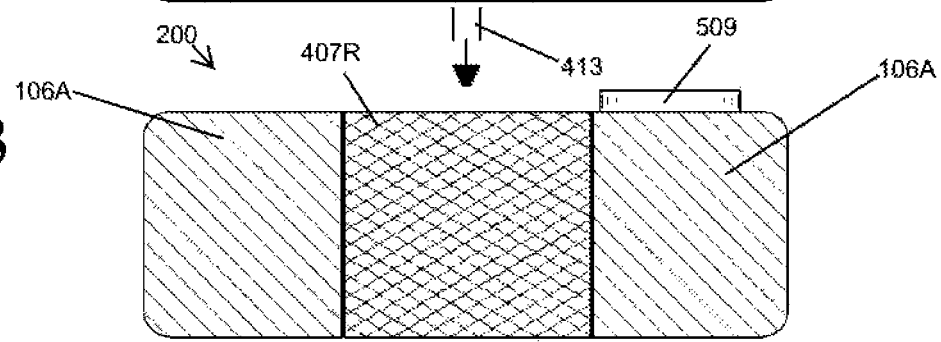
Fig. 4J3
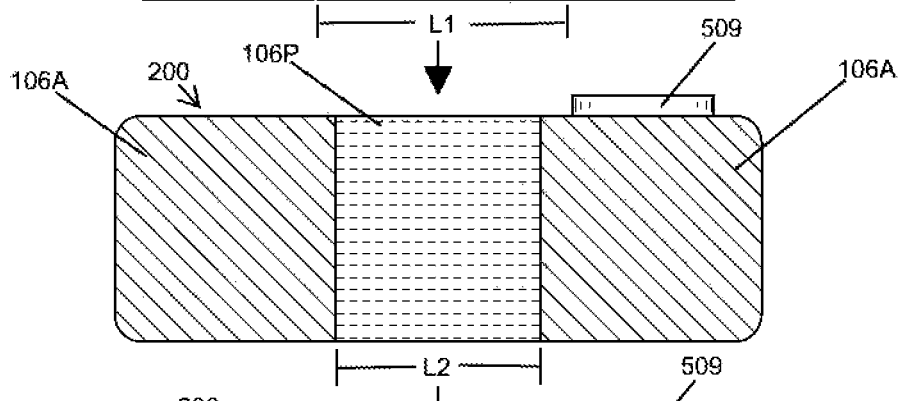
Fig. 4J4
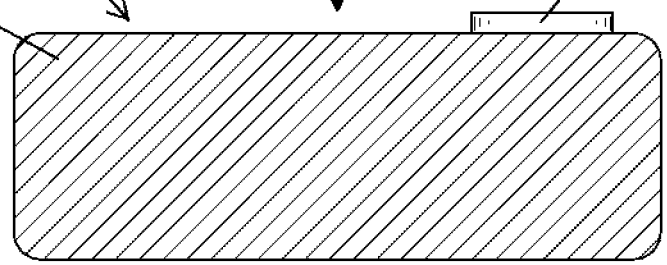
Fig. 4J5

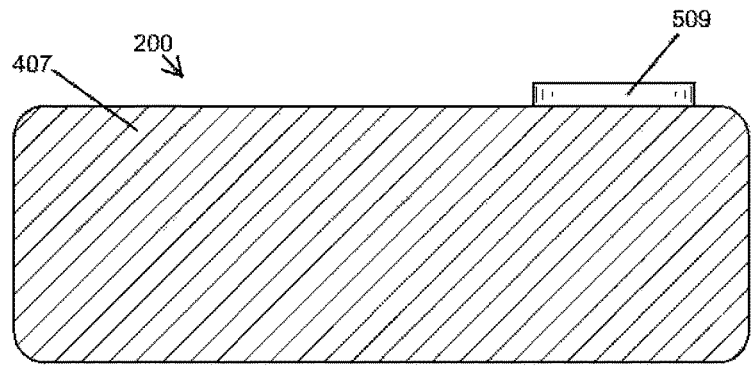
Fig. 4K1
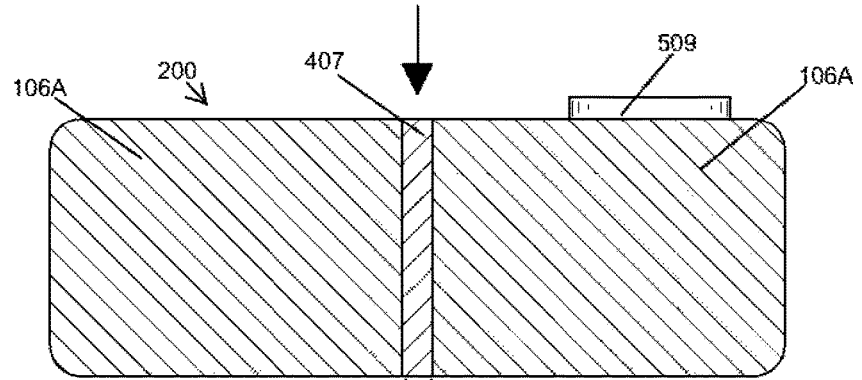
Fig. 4K2
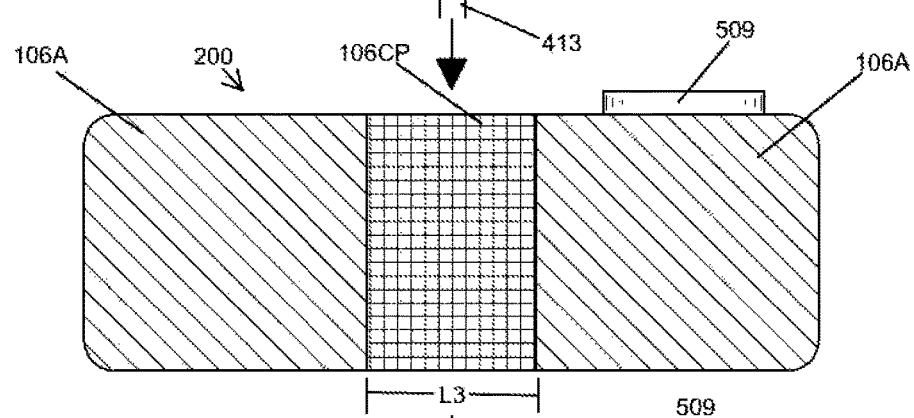
Fig. 4K3
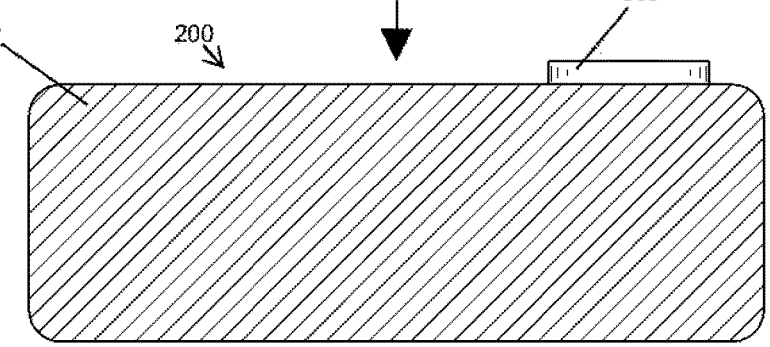
Fig. 4K4

Fig. 4K5
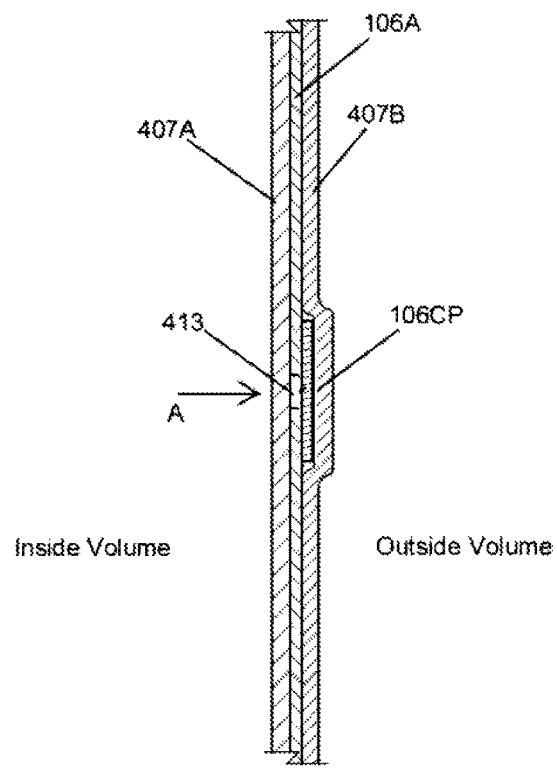
Fig. 4K6
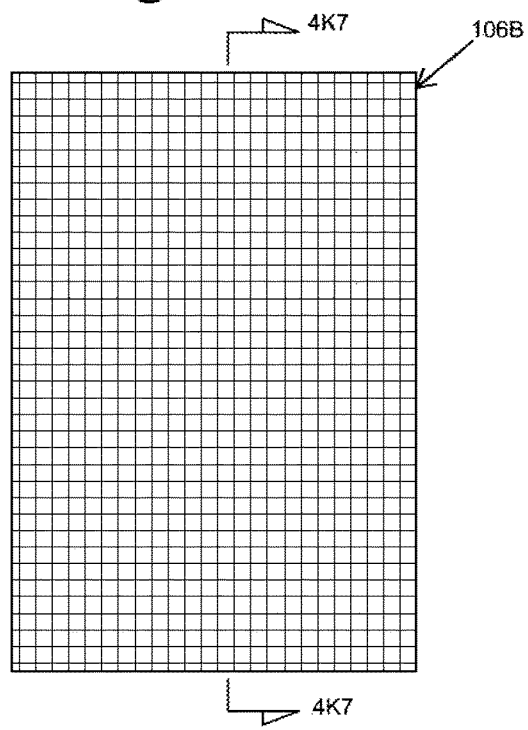
Fig. 4K7
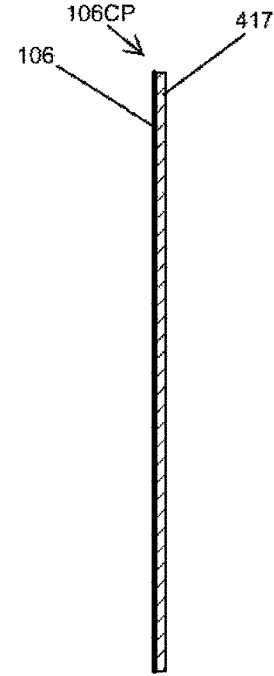

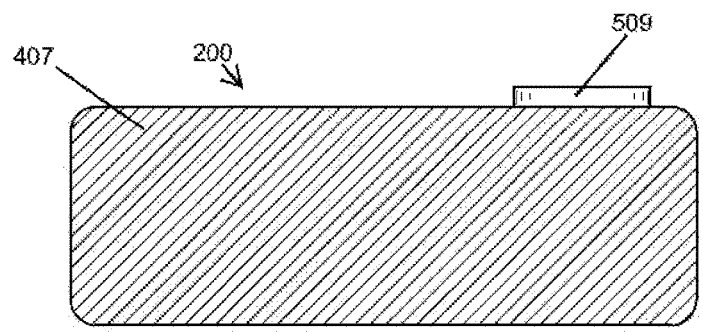
Fig. 4L1
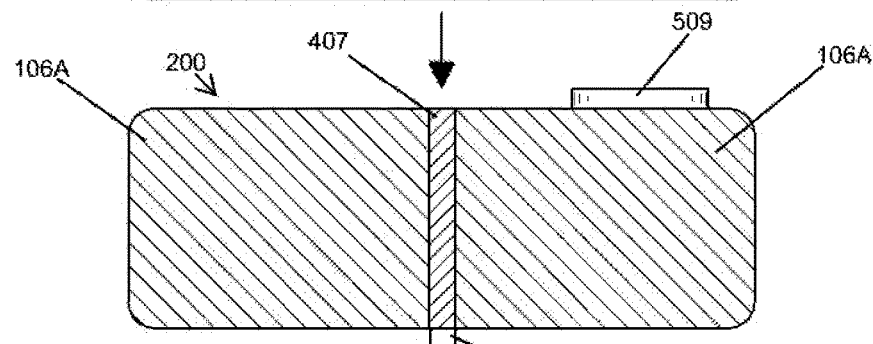
Fig. 4L2
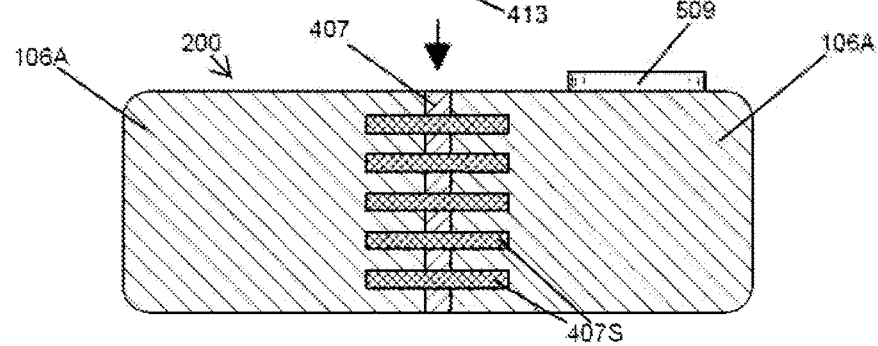
Fig. 4L3
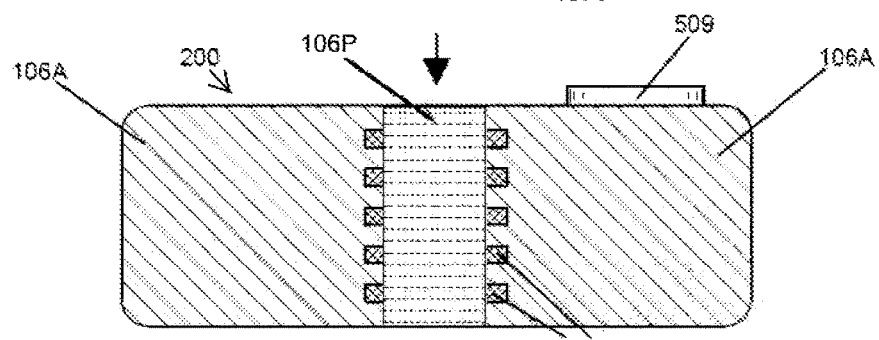
Fig. 4L4
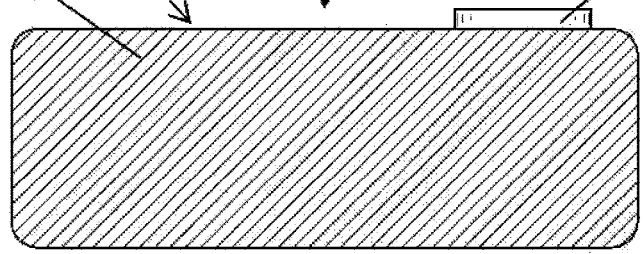
Fig. 4L5

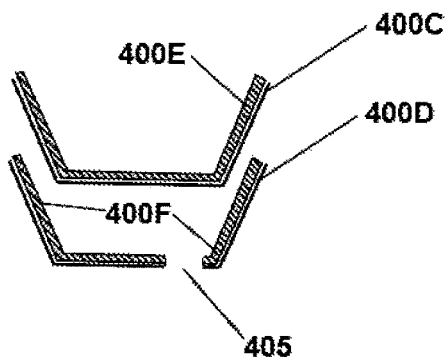
FIG. 7A1
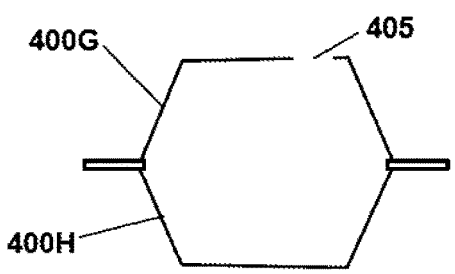
FIG. 7B1
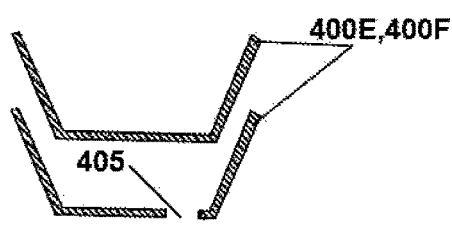
FIG. 7A2
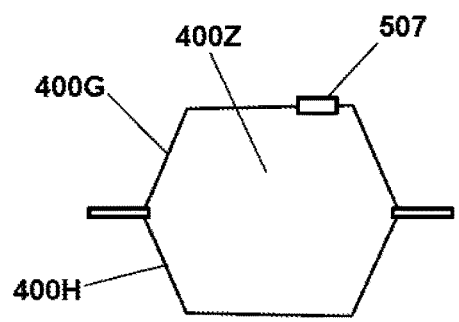
FIG. 7B2
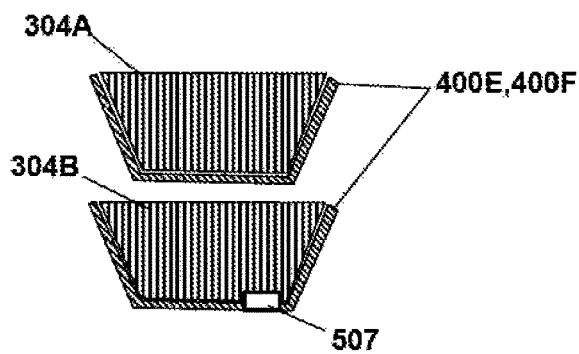
FIG. 7A3
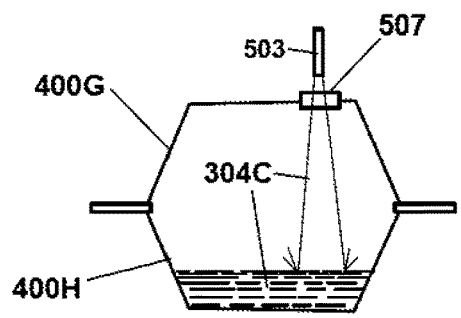
FIG. 7B3
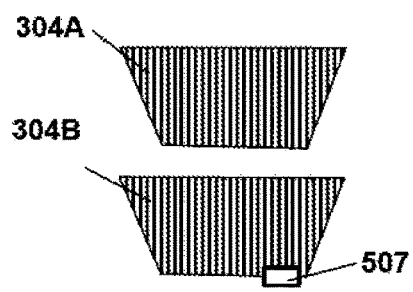
FIG. 7A4
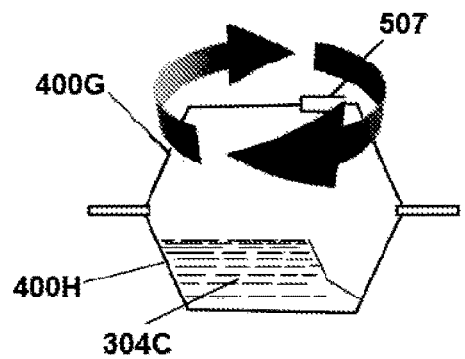
FIG. 7B4

METHOD AND SYSTEM FOR FORMING A SELF-SEALING VOLUME USING A BREATHER SYSTEM

THE FIELD OF THE INVENTION

The present invention is related generally to the field of containers for materials, and more specifically related to the field of self-sealing fuel tanks These fuel tanks are frequently preferred in applications where fuel fire and explosion risks are high, as in military, armored and racing vehicles.

BACKGROUND

Self-sealing fuel tanks currently exist in the conventional art. One problem with these conventional self-sealing fuel tanks is that they are manufactured using labor intensive hand lay up processes that require long cure times. Large numbers of self-sealing fuel tanks thus cannot be manufactured over a reasonable time period.

In addition, these conventional manufacturing techniques and materials do not allow for precise control of the outer dimensions of self-sealing fuel tank, a problem where tight fits are required and maximum fuel capacity is desired. A closed molding process using conventional composite construction techniques with conformable elastomeric materials may allow for precise control of the outer dimensions of self-sealing fuel tanks But there are several challenges that must be addressed.

Air entrapment or air inclusion is a well known problem in the conventional fabrication of fiber-reinforced composites. Air entrapment can result in poor interlaminar adhesion between layers, poor dimensional conformity and less than optimum composite tensile, puncture and impact properties.

One method for making fiber-reinforced composites is the hand layup method. In this method, the fabric intermediates are laid in the impregnation mold by hand and wetted with the matrix. Air is removed from the laminate, by pressing against it with the aid of a roller. This is intended to remove from the layers of fabric not only air present in the laminate structure but also excess matrix material. The procedure is repeated until the desired layer thickness is achieved. Once all the layers have been applied, the component must cure. Curing is performed through a chemical reaction between the matrix material and a curing agent added to the matrix material. The advantage of the hand layup method is the small tool and low equipment outlay. However, this is offset against a low quality of component (low fabric content) and the high level of manual effort, which requires trained laminators.

Hand layup can also be performed as a closed method. The closed method is performed using a vacuum press. Once the fabric mats have been introduced into the impregnation mold, the mold is covered with a release film, a suction fleece and a vacuum film. A vacuum is generated between the vacuum film and the mold. This has the effect of compressing the composite. Any air still included is removed by suction, and the excess matrix material is absorbed by the suction fleece. This means that a higher quality of component can be achieved than with the open hand layup method.

The prepreg method is another closed method. In this, fabric mats which are pre-impregnated with matrix material and have thus already been wetted are laid in the impregnation mold. In this case, the resin is no longer liquid but has a solid, slightly tacky consistency. Air is then removed from the composite by means of a vacuum bag and it is then cured, often in an autoclave, under pressure and heat. Because of the operational equipment required (cooling plant, autoclaves) and the demanding process (temperature management), the prepreg method is one of the most expensive manufacturing methods. However, it also enables one of the highest levels of quality of component.

The vacuum infusion method is another closed method for making fabric-reinforced composites. In this method, the dry fabric layers are laid in an impregnation mold coated with release agent. A release fabric and a distribution medium are placed over this, and this facilitates even flow of the matrix material. A vacuum sealing tape seals the film to the impregnation mold, and the component is then evacuated with the aid of a vacuum pump. The air pressure presses together the parts that have been laid in the mold and fixes them. The suction applied draws the tempered liquid matrix material into the fiber material. Once the fabrics have been completely wetted, the supply of matrix material is stopped and the wetted fiber-reinforced composite material can be cured and removed from the impregnation mold. The advantage of this method is that the fibers are wetted evenly and with almost no air inclusion, and so the components produced are of high quality and there is good reproducibility.

Other techniques of mitigating air inclusion are known to those skilled in the art. In conventional self-sealing fuel tanks bleeder cords are added to the composite structure. These bleeder cords are built into the composite structure and fed out of the mold so as to provide a conduit for air to escape during vacuum molding.

Unfortunately the above conventional composite fabrication methods cannot be used for the manufacture of self sealing fuel tanks that employ a closed molding process. The infusion method cited as one of the most effective methods to prevent air inclusion cannot be used because of the viscosity and the reactive nature of the available elastomeric materials. For instance, a polyurethane reaction mixture retains a suitably low viscosity for an insufficient period of time for the resin to fully impregnate the fabric layers and drive out air. This is because the reaction mixture is primarily a solid at room temperature and unless heat is applied the viscosity will increase as it loses heat. Furthermore, heating the reaction mixture to reduce the viscosity is impractical since the reaction mixture will begin to react when heat is applied and thereby increase in viscosity as the polyurethane polymer is formed. Bleeder cords are problematic since they extend outside of the fuel tank and must be cut even with the volume surface after fabrication of the fuel tank. This generates defects in the volume that must be patched and sealed thereby creating irregular surfaces. Additional defects occur when the cut cords are inadequately patched as frequently happens, resulting in leakage pathways. This approach thus creates an irregular volume surface and is highly dependent upon operator proficiency and skill.

The above conventional methods of composite fabrication are further rendered impractical since the self-sealing fuel tanks contain a self-sealing layer that is impermeable to air. It is not possible for included air that is located inside the self-sealing layer to migrate out of the composite structure since it is trapped between an inner liner and the self-sealing layer, two air impermeable layers. A method to remove trapped air is therefore needed.

BRIEF SUMMARY OF THE INVENTION

It has been discovered that a fabric and an elastomeric material (referred to later as a fabric trilayer) combined with a sealant may be applied in such a fashion so as to eliminate or minimize air entrapment in an elastomeric composite structure that forms a seal-sealing volume. It has thus been realized that in doing so the performance of the self-sealing volume is dramatically improved. This construction approach usually can be accomplished without significantly adding to the weight or thickness of the volume and without affecting the outer dimension of the self-sealing volume.

A method for forming a self-sealing volume is described. The system includes an elastomeric composite structure comprising at least one layer of an elastomeric material. The structure further may include at least one layer of a fabric, and at least one sealing layer. A fuel impermeable inner liner may be positioned in an inner region relative to the other layers.

The fabric may comprise fibers made from nylon materials. The fabric and self-sealing layers are positioned relative to each other so as to create a path for air to escape when the volume is pressurized to consolidate layers.

The at least one sealing layer may comprise at least one of an unvulcanized or partially vulcanized natural rubber (NR), a polyisoprene (IR), a styrene butadiene (SBR), or a blend of these materials. In other exemplary embodiments, the sealing layer may comprise polyurethane. In other exemplary embodiments, the sealing layer may comprise fully vulcanized (>1% sulfur) rubber. Other alternative materials for the sealing layer may include, but are not limited to, aliphatic polyurethanes.

Another inventive aspect of the method and system is that the preform release layer is inflated during curing of the elastomeric material layer. With this inflation of the preform release layer, the elastomeric composite layer conforms to the exact dimensions of the mold which holds the preform and the elastomeric composite sandwiched there between. At the same time air is driven out of the composite structure. This process yields a dimensionally correct/precisely built self-sealing volume.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all Figures.

FIG. 2F is a cross-sectional view of the wall of FIG. 2E in which the fluid continues to react with the sealing layer causing the sealing layer to further expand into the close the volume containing the fluid.

FIG. 3A is a diagram illustrating fibers receiving a polyurethane coating.

FIG. 3B is a diagram illustrating a fabric receiving a polyurethane coating.

FIG. 4F1 is a cross-sectional view of a self-sealing volume in the form of a fuel tank illustrating the individual composite layers along with paths of air escape according to one exemplary embodiment.

FIG. 4F2 is a cross-sectional view of a fabric trilayer that is depicted in FIG. 4F1.

FIG. 4J1 is a side view of an intermediate self-sealing volume illustrating an inner layer of the fabric trilayer.

FIG. 4J2 is a side view of an intermediate self-sealing volume illustrating the sealant applied with a gap over the fabric trilayer of FIG. 4J1.

FIG. 4J3 is a side view of an intermediate self-sealing volume illustrating a breather fabric applied over the gap illustrated in FIG. 4J2.

FIG. 4J4 is a side view of an intermediate self-sealing volume illustrating a sealant patch applied over the gap and breather fabric of FIG. 4J3.

FIG. 4J5 is a side view of an intermediate self-sealing volume illustrating an outer layer of the trilayer fabric applied over the sealant patch and sealant of FIG. 4J4.

FIG. 4K1 is a side view of an intermediate self-sealing volume illustrating an inner layer of the fabric trilayer.

FIG. 4K2 is a side view of an intermediate self-sealing volume illustrating the sealant applied with a gap over the fabric trilayer of FIG. 4K1.

FIG. 4K3 is a side view of an intermediate self-sealing volume illustrating a calendared sealant patch applied over the gap and sealant of FIG. 4K2.

FIG. 4K4 is a side view of an intermediate self-sealing volume illustrating an outer layer of the trilayer fabric applied over the calendared sealant patch and sealant of FIG. 4K3.

FIG. 4K5 is a cross-sectional top, view of the calendared sealant patch embodiment of FIG. 4K4.

FIG. 4K6 is a front view of the calendared sealant patch of FIG. 4K3 illustrated alone.

FIG. 4K7 is a side view of the calendared sealant patch illustrated in FIG. 4K6 illustrated alone.

FIG. 4L1 is a side view of an intermediate self-sealing volume illustrating an inner layer of the fabric trilayer.

FIG. 4L2 is a side view of an intermediate self-sealing volume illustrating the sealant applied with a gap over the fabric trilayer of FIG. 4L1.

FIG. 4L3 is a side view of an intermediate self-sealing volume illustrating a breather fabric strips applied over the gap illustrated in FIG. 4L2.

FIG. 4L4 is a side view of an intermediate self-sealing volume illustrating a sealant patch applied over the gap and breather fabric strips of FIG. 4L3.

FIG. 4L5 is a side view of an intermediate self-sealing volume illustrating an outer layer of the trilayer fabric applied over the sealant patch and sealant of FIG. 4L4.

FIG. 6 a flowchart illustrating a routine or submethod for creating a polyurethane reaction mixture according to an exemplary embodiment.

FIG. 7A1 is a cross-sectional view of a device for forming flexible molds according to an exemplary embodiment.

FIG. 7A2 is a cross-sectional view of the flexible molds formed from the device of FIG. 7A1 according to an exemplary embodiment.

FIG. 7A3 is a cross-sectional view of preform material positioned within the flexible molds of FIG. 7A2 according to an exemplary embodiment.

FIG. 7A4 is a cross-sectional view of the two halves of a gas-permeable, solid preform generated from the flexible molds of FIG. 7A3 according to an exemplary embodiment.

FIG. 7A5 is a cross-sectional view of the two halves of the gas-permeable, solid preform put together according to an exemplary embodiment.

FIG. 7A6 is a cross-sectional view of the two halves of the gas-permeable, solid preform after apertures or holes have been created within the preform according to an exemplary embodiment.

FIG. 7B1 is a cross-sectional view of a solid mold for forming a gas-impermeable, hollow preform according to an exemplary embodiment.

FIG. 7B2 is a cross-sectional view of the solid mold of FIG. 7B1 with a fixture attached to a side of the solid mold having an aperture according to an exemplary embodiment.

FIG. 7B3 is a cross-sectional view of the solid mold in which a liquid state of the preform material is poured into the solid mold via the fixture according to an exemplary embodiment.

FIG. 7B4 is a cross-sectional view of the solid mold containing the preform liquid material while the solid mold is being rotated according to an exemplary embodiment.

FIG. 7B5 is a cross-sectional view of the solid mold being opened after curing of the preform liquid material into an gas-impermeable, hollow preform according to an exemplary embodiment.

FIG. 7B6 is a cross-sectional view of the gas-impermeable, hollow preform after apertures or holes have been created within the preform according to an exemplary embodiment.

DETAILED DESCRIPTION OF THE INVENTION

The word "exemplary" is used herein to mean "serving as an example, instance, or illustration." Any aspect described herein as "exemplary" is not necessarily to be construed as preferred or advantageous over other aspects.

Figure 1A:
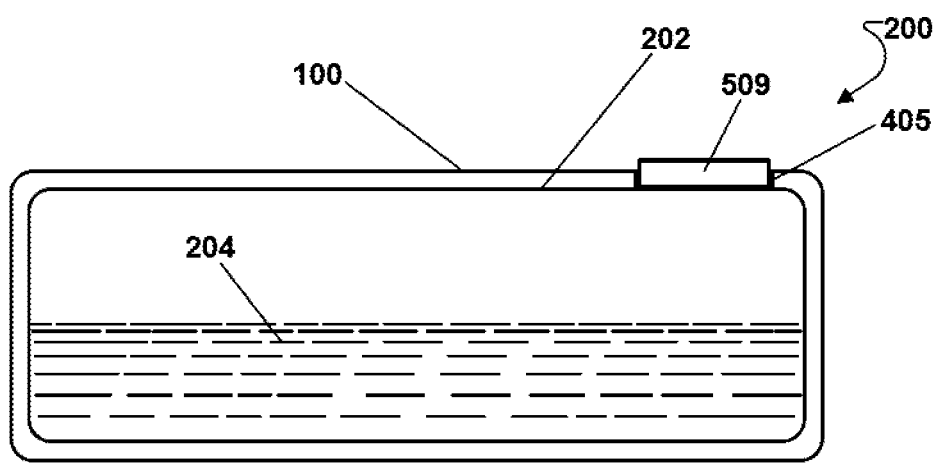
FIG. 1A is a cross-sectional view of a self-sealing volume in the form of a fuel tank according to one exemplary embodiment.

FIG. 1A is a cross-sectional view of a self-sealing volume or wall system 200 in the form of a fuel tank according to an exemplary embodiment. The wall system 200 comprises a wall 100 and a liner 202 which will be described in more detail below. The wall system 200 may contain a fluid 204, such as, but not limited to, a hydrocarbon fuel. The wall system 200 may further comprise a nut ring 509 containing an access port 405 which will be described below in connection with FIGS. 4C-4E. The wall system 200 may comprise a composite of elastomeric material and fabric as described in further detail below. The composite of elastomeric material and fabric may include a self-healing layer for sealing after ballistic penetration.

Figure 1B:
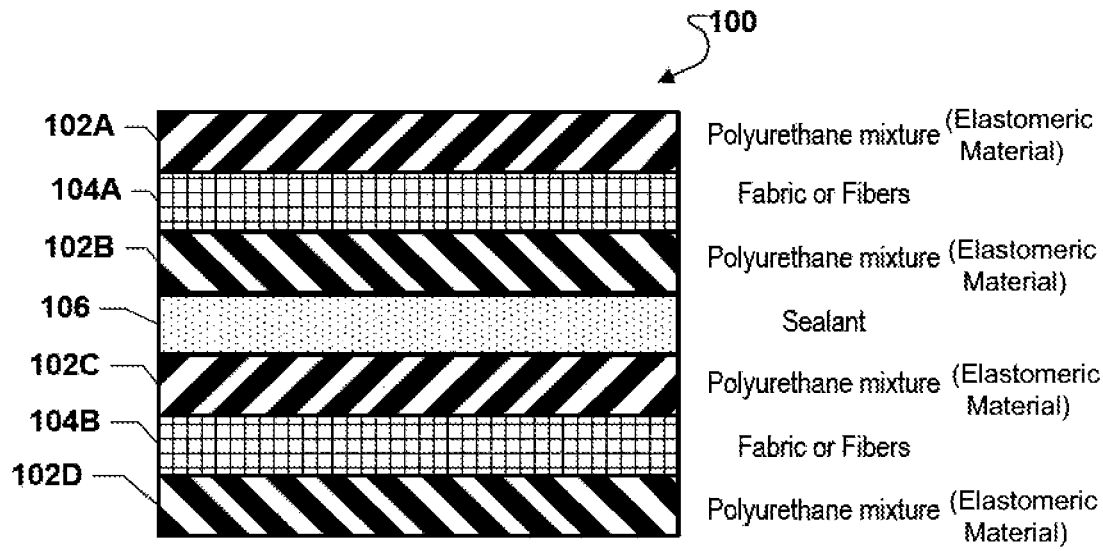
FIG. 1B is a cross-sectional view of a portion of a wall of a self-sealing volume according to one exemplary embodiment.

Referring now to FIG. 1B, this figure is a cross-sectional view of a portion of a wall 100 for forming the self-sealing volume or wall system 200 (of FIG. 1A) according to one exemplary embodiment. The wall 100 may comprise an elastomeric composite that includes a combination of layers such as, for example, a polyurethane reaction mixture layer 102, a fabric or fiber layer 104, and a sealant layer 106.

In the exemplary embodiment illustrated in FIG. 1B, the wall 100 may comprise an elastomeric material such as a first polyurethane reaction mixture layer 102A, a first fabric or fiber layer 104A, a second elastomeric material such as a polyurethane reaction mixture layer 102B, a sealant layer 106, a third elastomeric material such as a polyurethane reaction mixture layer 102C, a second fabric were fiber layer 104B, and a fourth elastomeric material such as a polyurethane reaction mixture layer 102D.

Where the elastomeric materials include a polyurethane reaction mixture, each polyurethane reaction mixture layer 102 may be made by reacting an organic diisocyanate or diisocyanate prepolymer with a reactive hydrogen-containing material having a molecular weight of about 700.0 to about 4000.0 and then curing the reaction product as described below in connection with the flow chart of the method 500 illustrated in FIG. 5. The reactive hydrogen-containing material may comprise at least one or more of a polyester polyol, a polyether polyol, or a hydrocarbon-polyol. In other exemplary embodiments, the sealant layer may be unvulcanized (no curative) rubber or partially vulcanized (<1% sulfur). The polyurethane reaction mixture layers 102 do not substantially react at room temperature, which is typically about 25.0° C. as understood by one of ordinary skill in the art.

Representative of the reactive hydrogen-containing materials are the broad classes of polyester polyols, polyether polyols, hydrocarbon-polyols. The polyester polyols that are preferred include the esters of adipic acid with the lower glycols such as ethylene glycol, propylene glycol, and butylene glycol, and higher glycols such as polyethylene glycol and polypropylene glycol and mixtures of these. The polyether polyols that are preferred include ethylene ether glycol, polyethylene ether, propylene ether glycol, polypropylene ether polyol, and polytetramethylene ether polyol and mixtures of these.

In conjunction with the polyol a short chain glycol, organic diamine or alkylanolamine may be used to increase the molecular weight of the polyurethane reaction mixture layer 102. Representative members of these classes of glycols, organic diamines or alkylanolamines useful in the present invention include, but are not limited to, ethylene glycols, propylene glycols, butane diols, methylene bis-chloroaniline, methylene dianiline, bis-amino phenyl sulfone and amino methyl propanol. If organic amines are used, then urea linkages will be created rather than urethane linkages, resulting in a mixed polyurethane urea.

Normally, any of the well-known organic polyisocyanates useful for making castings may be utilized for the polyurethane reaction mixture layer 102, with toluene diisocyanate and methylene diphenyldiisocyanate exemplifying the ones most frequently used. The polyisocyanates are normally reacted at about 0.8 to about 1.5 mols per each mol of reactive hydrogen-containing material.

A crosslinked elastomeric material may be used. Such a material can be used with a polyurethane by incorporating a cross-linking monomer, such as a crosslinking polyol, in the polyurethane reaction mixture layer 102 in order to improve the compression set and to minimize plastic deformation at higher temperatures. As understood by one of ordinary skill in the art, compression set is the tendency of elastomers to undergo permanent deformation. It is the tendency of some elastomers to not recover in a completely elastic manner. An addition of a crosslinking polyol such as described above may remedy this characteristic. This compression set property may be measured by ASTM D395. As understood by on of ordinary skill in the art plastic deformation at higher temperatures is the tendency of elastomers to permanently deform from their original shape when heated above the softening or melting temperature. An addition of a cross-linking polyol such as described above may remedy this characteristic. The softening or melting temperature may be measured by ASTM D3418-03.

Further, a rubber adhesion activator monomer, such as allyl-alchohol, also may be used in the polyurethane reaction mixture layer 102 in order to improve its adhesion properties to rubber.

This adhesion activator monomer may improve the adhesion of the polyurethane reaction mixture layer 102 to the sealant layer 106 by providing an active group (alcohol) for bonding with the polyurethane reactive ingredients of the polyurethane reaction mixture layer 102 and an active group (olefin) that will react with the rubber of the sealant layer 106 during vulcanization.

One of ordinary skill in the art will appreciate that if the preferred elastomeric materials can be applied as a somewhat fluid layer 102, then this elastomeric material layer 102 may more readily coat the fiber or fabric layer 104 before the elastomer has had a chance to react or cure to form an intractable polymer. This is done by selecting a polyurethane reaction mixture that has a relatively long gel time, such as on the order of about 30 minutes to about 120 minutes. The preferred gel time may comprise a period of between about 15.0 to about 90.0 minutes. A gel time comprises an interval of time required for the polyurethane reaction mixture layer 102 to become a solid or semisolid gel prior to fully reacting to form a polyurethane.

The polyurethane reaction mixture layer 102 may be applied by brushing, troweling, swabbing, dipping or spraying, or other ways as understood by one of ordinary skill in the art. After the polyurethane reaction mixture layer 102 has been sufficiently spread and incorporated into the fabric or fiber layer 104, then the polyurethane reaction mixture layer 102 is ready to be cured.

The polyurethane reaction mixture layer 102 is selected such that heat is required for reaction and cure. Heat can be supplied from a conventional oven, an autoclave, a microwave oven or from a press, or alternative ways as understood by one of ordinary skill in the art. Once the liquid polyurethane reaction mixture layer 102 is applied onto the respective composite layers of the wall portion 100, the entire uncured structure may be placed into a three dimensional, dimensionally correct mold 400 (as will be described below in connection with FIG. 4). Curing is effected by heating the mold 400 to a sufficient temperature and for a sufficient time to cause the polyurethane reaction mixture layer 102 to react and form a solid polyurethane layer 102. A sufficient temperature for curing is generally between about 80.0° C. to about 175.0° C., and preferably between about 100.0° C. to about 150.0° C., and more preferably at about 120.0° C. However, other temperatures may be used as understood by one of ordinary skill in the art and are within the scope of this disclosure. The time for curing is generally between about 20.0 minutes to about 360.0 minutes (min), and preferably between about 60.0 min to about 120.0 min, and more preferably for about 90.0 min. However, other times may be used as understood by one of ordinary skill in the art and are within the scope of this disclosure. As noted previously, the amount of pressure provided by the gaseous pressure source 403 is generally between about 2.0 psi to about 80.0 psi, and preferably between about 10.0 psi to about 40.0 psi, and more preferably at about 20.0 psi. However, other pressures may be used as understood by one of ordinary skill in the art and are within the scope of this disclosure. In addition to polyurethane reaction mixtures that are used as the elastomeric component of the composite other elastomeric materials may also be used. Such elastomeric materials may include but are not limited to polyurethane dispersions, solvated polyurethanes, solvated nitrile butyl rubber, solvated polychloroprene, silicones, polysulfides and other materials that can be applied at a low viscosity and then cured to form an intractable but flexible elastomer.

The fabric or fiber layer 104 may comprise coated polyamide, aramid, polyester, polypropylene or polyethylene fibers or coated fabrics of the same materials. The coating on the fibers or fabrics in layer 104 may comprise solvated or aliphatic polyurethane that is applied during the fiber or fabric manufacturing process. As understood by one of ordinary skill in the art, aliphatic is a general class of polyurethanes (excluding aromatic) which is typically easier to solvate than aromatic polyurethanes. The coating may also comprise a resorcinol formaldehyde (RFL) or an isocyanate. Further details of this coating for the fibers or fabric layer 104 are described below in connection with FIGS. 3A-3B

As understood by one of ordinary skill in the art, polyamide is a class that includes NYLON and anisotropic aromatic polyamide (such as KEVLAR™). As understood by one of ordinary skill in the art, polyester is a class that includes polyethylene terephthalate and anisotropic aromatic polyester. The fabric may comprise at least one of NYLON 6, NYLON 66, polyester, an anisotropic aromatic polyamide, or an anisotropic aromatic polyester from about 5.0 ounces per square yard ("oz/SY") to about 30.0 oz/SY. It is possible to use other fibers and fabrics with the elastomeric material layer 102, but polyamide and polyester fibers and fabrics are preferred due to their physical performance characteristics in ballistic and blast situations.

The sealant layer 106 typically is sandwiched between two elastomeric material layers 102 and two or more fabric or fiber layers 104 for reinforcement. Typical materials suitable for use as the sealant layer 106 may comprise unvulcanized, partially vulcanized and/or vulcanized natural rubber (NR). Other materials that may be used include polyisoprene (IR), styrene butadiene (SBR) and blends of SBR with NR or IR. In other exemplary embodiments, the sealant layer 106 may be unvulcanized. In other exemplary embodiments, the sealant layer 106 may comprise fully vulcanized (>1.0% sulfur) rubber. Other alternative materials for the sealant layer 106 may include, but are not limited to, aliphatic polyurethanes While the thicknesses of each of the layers illustrated in FIG. 1 have been shown to be equivalent, one of ordinary skill in the art will recognize that the actual thicknesses of each layer may vary and may be adjusted depending upon the level of protection desired for a particular volume. Wall gauge design dimensions are usually driven by weight restrictions, ballistic needs and overall flexibility requirements. For example, the finished product for the self-sealing wall portion 100 typically has the following dimensions according to one illustrative embodiment: a first elastomeric material layer 102A having a thickness of approximately 0.1 to approximately 1.0 mm; a first fabric or fiber layer 104A having a thickness of approximately 0.5 to approximately 2.0 mm; a second elastomeric material layer 102B having a thickness of approximately 0.1 to approximately 1.0 mm; a sealant layer 106 having a thickness of approximately 0.5 to approximately 13.0 mm; a third elastomeric material layer 102C having a thickness of approximately 0.1 to approximately 1.0 mm; a second fabric or fiber layer 104B having a thickness of approximately 0.5 to approximately 2.0 mm; and a fourth elastomeric material layer 102D having a thickness of approximately 0.1 to approximately 1.0 mm.

Further, one of ordinary skill in the art will recognize that the number and size of the layers may be varied without departing from the scope of the present disclosure. That is, fewer or a greater number of layers with different thicknesses may be used for a particular embodiment without departing from the scope of the technology described herein.

Figure 2A:
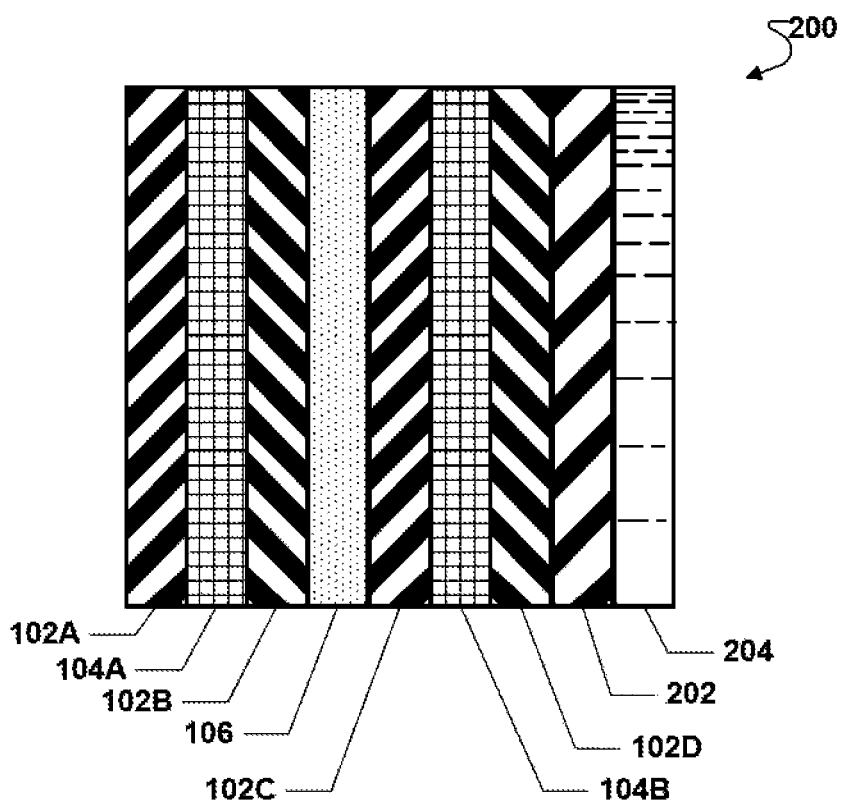
FIG. 2A is a cross-sectional view of an entire wall for a self-sealing volume according to the exemplary embodiment of FIG. 1.

Referring now to FIG. 2A, this figure is a cross-sectional view of an entire wall or wall system 200 for a self-sealing volume according to one exemplary embodiment. The wall system 200 comprises all of the layers of the wall 100 described above in connection with FIG. 1B, in addition to a liner layer 202 and the fluid 204.

The liner layer 202 may comprise any elastomeric material that will have a greater resistance to hydrocarbon fuel 204 than the elastomeric material 102. Exemplary materials include, but are not limited to, nitrile rubber, polyurethane, polysulfide and polyvinylidene fluoride, polyurea, polyvinylalchohol (PVA), Hydrogenated Nitrile Butadiene Rubber (HNBR), Epichlorohydrin rubber (ECO), or any fuel resistant elastomer. An optional barrier layer, described below, may also be used and positioned on the outside of the liner layer 202.

The fluid 204 may comprise a fuel, and particularly a hydrocarbon fuel 204, such as gasoline, diesel-based fuels, biofuels, ethanol fuels used in military crafts such as airplanes, boats, helicopters, tanks, cars, jeeps, all-terrain-vehicles (ATVs), and other similar vehicles. The wall 100 provides a self-sealing barrier and protection for the liner layer 202 in order to contain the fluid 204 within the entire wall system 200.

Figure 2B:
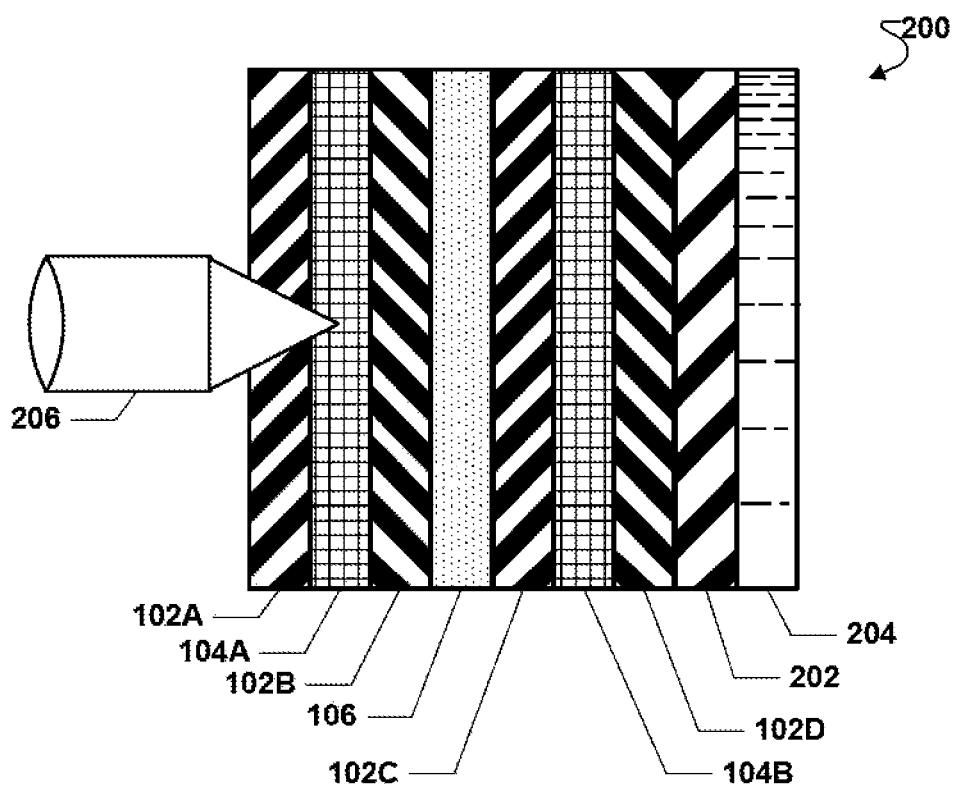
FIG. 2B is a cross-sectional view of the wall of FIG. 2A in which a projectile has begun to penetrate the wall entering from outside of the self-sealing volume towards the inside of the volume containing a fluid, such as fuel.

FIG. 2B is a cross-sectional view of the wall system 200 of FIG. 2A in which a projectile 206 has begun to penetrate the wall system 200 entering from outside of the self-sealing volume towards the inside of the volume containing a fluid 204, such as fuel. The projectile 206 may comprise any type of object that is launched from a gun or ballistic system, such as a bullet or fragment, and/or fragments from high velocity vehicle accidents. In the exemplary embodiment illustrated in FIG. 2B, the projectile 206 has already penetrated the first elastomeric material layer 102A and is starting to enter the first fabric or fiber layer 104A.

Figure 2C:
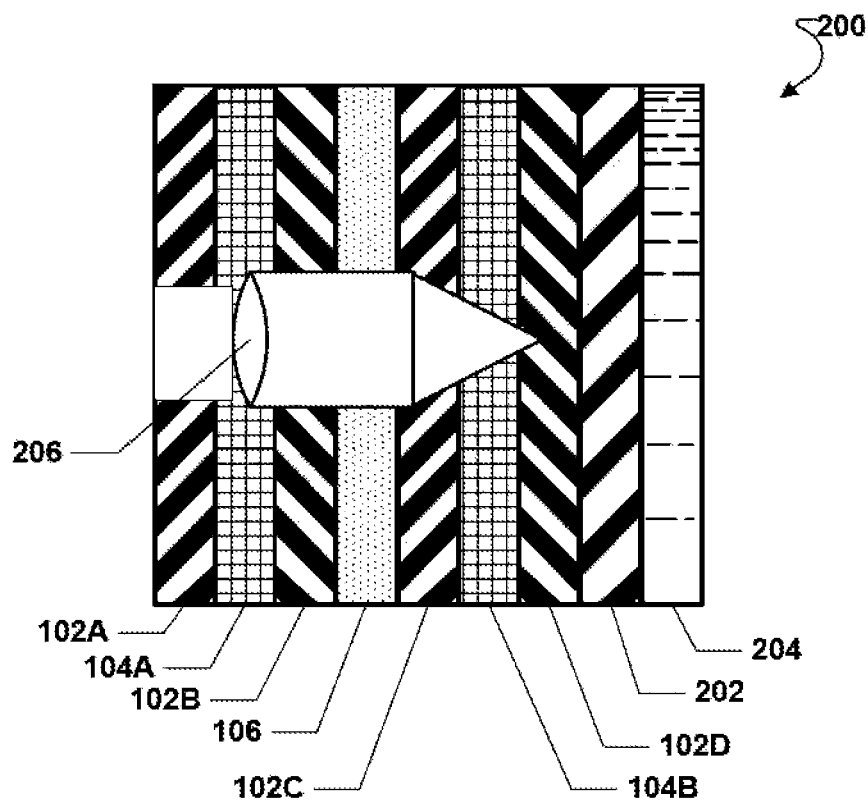
FIG. 2C is a cross-sectional view of the wall of FIG. 2B in which the projectile has continued to penetrate the wall from the outside of the self-sealing volume towards the inside of the volume containing a fluid, such as fuel.

FIG. 2C is a cross-sectional view of the wall system 200 of FIG. 2B in which the projectile 206 has continued to penetrate the wall system 200 from the outside of the self-sealing volume towards the inside of the volume containing a fluid 204, such as fuel. In this exemplary embodiment, the projectile 206 has penetrated through the first elastomeric material layer 102A, the first fabric or fiber layer 104A, the second elastomeric material layer 102B, the sealant layer 106, the third elastomeric material layer 102C, the second fabric or fiber layer 104B, and has started to enter the fourth elastomeric material layer 102D.

Figure 2D:
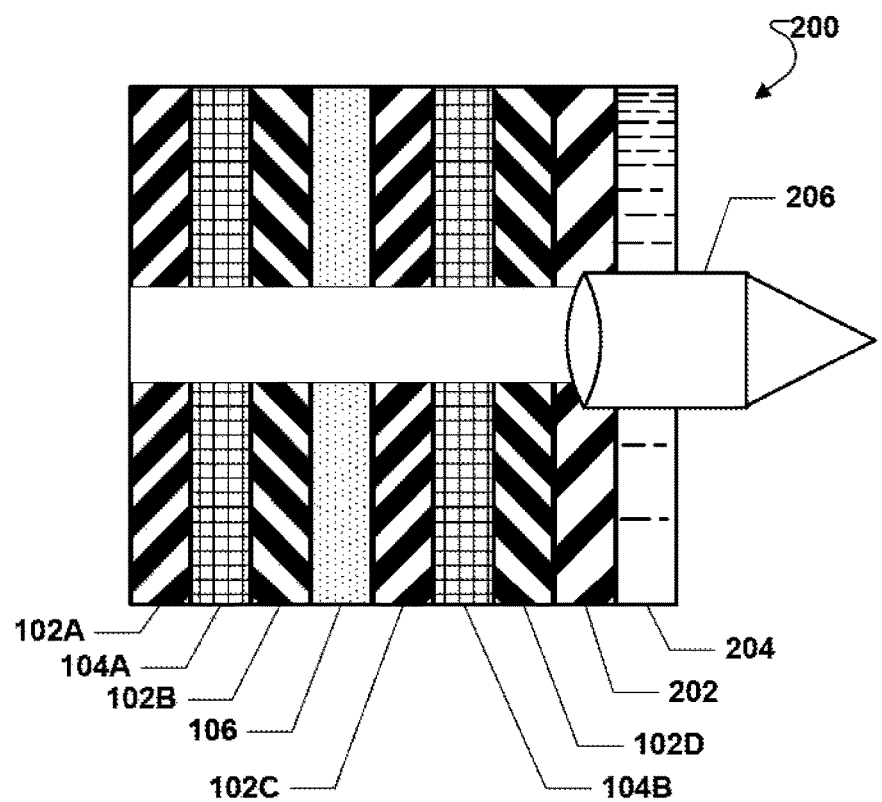
FIG. 2D is a cross-sectional view of the wall of FIG. 2C in which the projectile has continued to penetrate the wall from outside of the self-sealing volume towards the inside of the volume containing a fluid, such as fuel.

FIG. 2D is a cross-sectional view of the wall system 200 of FIG. 2C in which the projectile 206 has continued to penetrate the wall system 200 from outside of the self-sealing volume towards the inside of the volume containing a fluid 204, such as fuel. In this exemplary embodiment, the projectile 206 has penetrated through all the layers of the wall system 200 including the liner layer 202 and has entered the volume containing the fluid 204 itself. Specifically, the projectile 206 has penetrated through all four layers of the elastomeric material layers 102, the two fiber or fabric layers 104, the single sealant layer 106, and the liner layer 202.

Figure 2E:
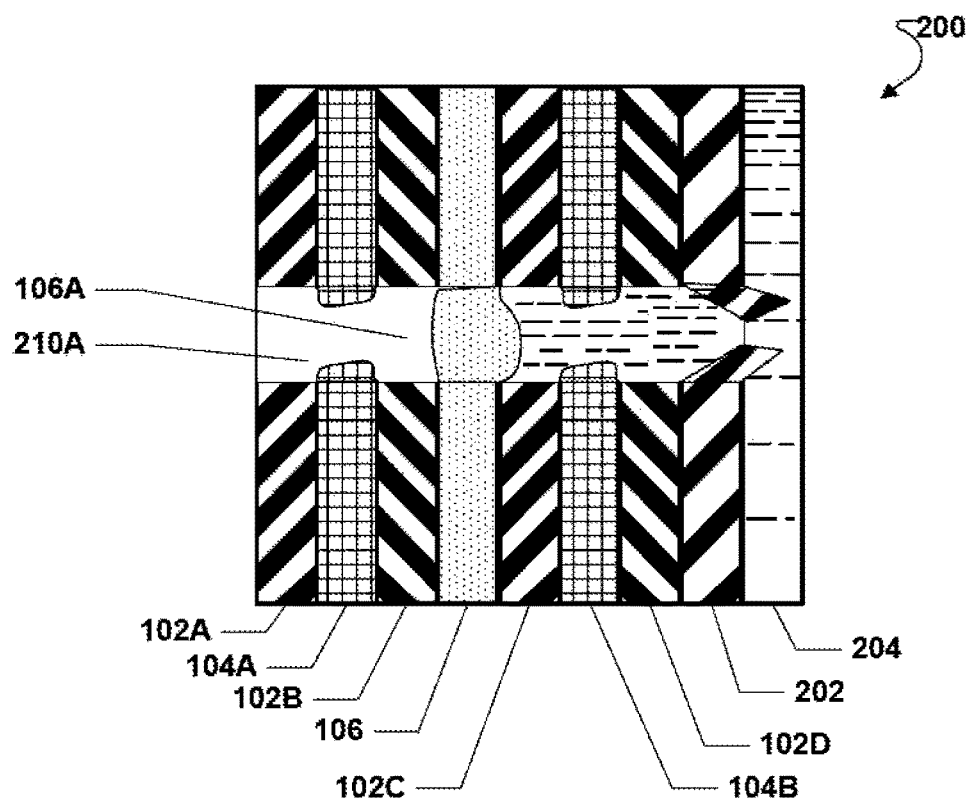
FIG. 2E is a cross-sectional view of the wall of FIG. 2D in which the projectile has completely penetrated the wall and has entered into the volume containing the fluid, such as fuel, and allowing the fluid to react with the sealing layer.

FIG. 2E is a cross-sectional view of the wall system 200 of FIG. 2D in which the projectile has completely penetrated the wall system 200 and has entered into the volume containing the fluid 204, such as fuel, thus allowing the fluid 204 to react with the sealant layer 106. In this exemplary embodiment, the fluid 204 which may comprise a fuel such as a hydrocarbon fuel may interact with the sealant layer 106 which may comprise unvulcanized or partially vulcanized natural rubber (NR). Other materials that may be used for the sealant layer 106, as described above, may include but are not limited to polyisoprene (IR), styrene butadiene (SBR) or blends of SBR with NR or IR.

In this exemplary embodiment, the sealant layer 106 includes a first portion 106A which has expanded into the cavity 210A formed by the projectile 206. The sealant layer 106 is selected from materials that are tacky in nature and which may have autoadhesion characteristics. Such materials may also swell around openings formed by projectiles that penetrate the materials. In other cases, it is believed that swelling of the sealant layer could occur due to a reaction between the sealant and a hydrocarbon liquids or any other type of liquid which may be stored in the self-sealing volume.

The sealant materials are generally themselves hydrocarbon elastomers such as unvulcanized or partially vulcanized, and/or fully vulcanized natural rubber (NR). Other materials that may be used for the sealant layer 106, as described above, may include but are not limited to polyisoprene (IR), styrene butadiene (SBR) or blends of SBR with NR or IR. Generally the materials selected will serve to swell into a cavity as large as that made by common projectiles 206, such as a 50 mm or 30 mm projectile, and smaller. The projectile 206 may comprise in-tact bullets, missiles, grenades, etc., and/or fragments thereof, and/or fragments from vehicle accidents/collisions.

This first portion 106A of the sealant layer 106 prevents the fluid 204 from escaping or leaking through the wall system 200 of the cavity 210A. Swelling of the sealant layer 106 initiates from the fuel side and proceeds in an outward direction. Fiber from the fabric layers 104A, 104B may also expand and fill the cavity 210 and may provide an additional, yet moderate level of sealing of the liquid 204 compared to the sealant layer 106. Meanwhile, the two elastomeric material layers 102C and 102D remain broken by the projectile 206.

As understood by one of ordinary skill in the art, various different sealing modalities may occur with the wall system 200. Because of strength, cut resistance and elongation of wall materials, the wall system 200 may stretch (bow) inward by a significant amount before the projectile 206 penetrates into the volume containing the fluid 204. When the wall system 200 recovers to essentially a flat surface, distances between materials forming the wall system 200 may shorten, and the stretched fibers and elastomeric molecular strands within the wall system 200 may provide a puckering kind of seal around the cavity/wound/opening. This seal may include the sealant layer 106 which may facilitate autoadhesion.

FIG. 2F is a cross-sectional view of the wall system 200 of FIG. 2E in which, in some instances, it is possible the fluid 204 may react with the sealant layer 106 causing the sealant layer 106 to further expand and to close the volume containing the fluid 204. In other instances or in addition to such a reaction between the fluid 204 and sealant layer 106, the sealant layer 106 as well as others may be stretched from the projectile 206 and this sealant layer 106 may provide a puckering kind of seal around the cavity/wound/opening due to inelastic expansion. Layer 106 is usually a hydrocarbon elastomer such as unvulcanized or partially vulcanized, and/or fully vulcanized natural rubber (NR). Other materials that may be used for the sealant layer 106, as described above, may include but are not limited to polyisoprene (IR), styrene butadiene (SBR) or blends of SBR with NR or IR.

In this exemplary embodiment, the first portion 106B has further expanded into the cavity 210B that was created by the projectile 206 when it passed through the wall system 200. As noted previously, the first portion 106B that has expanded into the cavity 210B because of its reaction with the fluid 204, which may comprise a hydrocarbon fuel, may prevent the fluid 204 from leaking through the cavity 210B formed by the projectile 206.

Referring now to FIG. 3A, this figure is a diagram illustrating fibers 105 receiving a polyurethane coating 301A. The coating 301A on the fibers 105 used to form a fiber layer 104C1 of FIGS. 1-2 may comprise solvated aliphatic polyurethane that is applied during the fiber or fabric manufacturing process. As understood by one of ordinary skill in the art, aliphatic is a general class of polyurethanes (excluding aromatic), which typically is easier to solvate than aromatic polyurethanes. Other materials in addition to polyurethanes can be used, such as a resorcinol formaldehyde latex (RFL) and an isocyanate.

FIG. 3B is a diagram illustrating a fabric comprising fibers 105 receiving a polyurethane coating 301B. The coating 301B on the fibers 105 used to form fabric layer 104C of FIGS. 1-2 may comprise solvated aliphatic polyurethane that is applied during the fiber or fabric manufacturing process. FIG. 3B further illustrates a nozzle 305 that may be used to apply the coating 301B of polyurethane to the fibers 105 of the fabric layer 104C2. Other ways or methods for applying the coating 301 may be used other than those illustrated in FIGS. 3A-3B, such as by applying the solvated polyurethane to the fabric layer 104C2 with a roller applicator or in a dip.

Figure 4A:
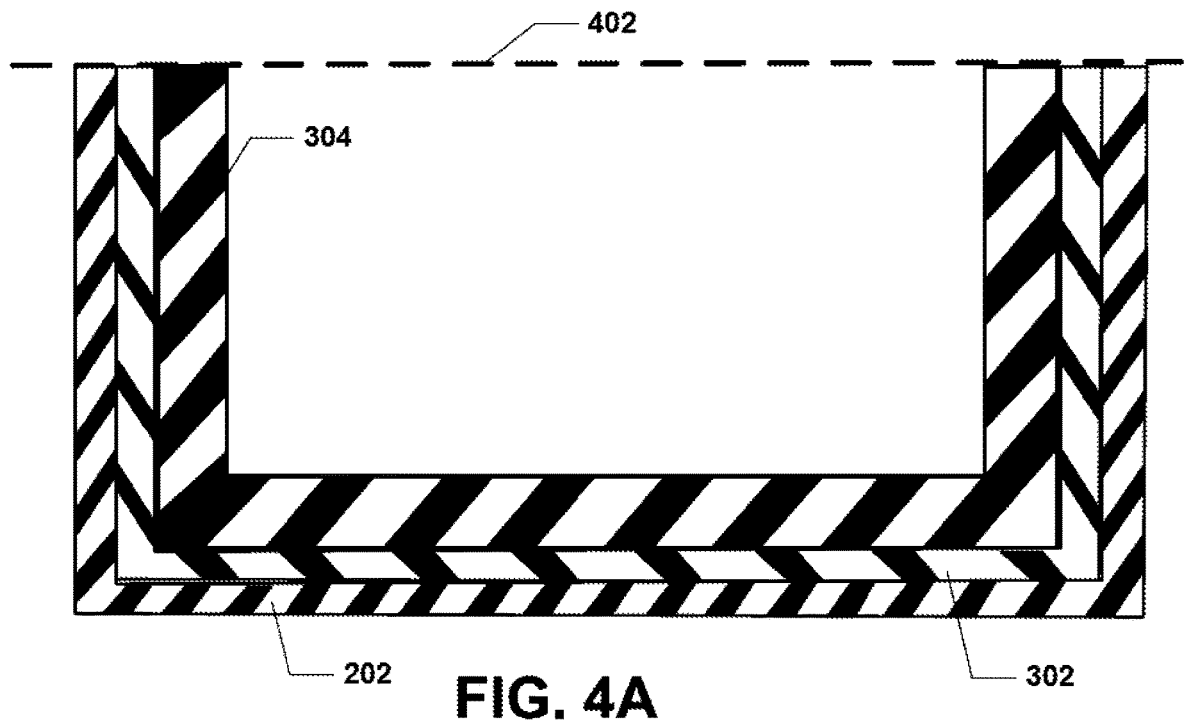
FIG. 4A is a cross-sectional view of a preform, a release layer, and a liner.

FIG. 4A is a cross-sectional view of one-half of a gas-impermeable, hollow preform or gas permeable solid preform 304, an elastomeric mold release layer 302, and a liner 202. The half-structure is noted by dashed line 402. As noted previously, the liner 202 layer may comprise any elastomeric material that will have a greater resistance to hydrocarbon fuel 204 than a polyurethane elastomer. Exemplary materials include, but are not limited to, nylon, polyurethane, nitrile rubber, polysulfide, polyurea, polyvinylalchohol (PVA), Hydrogenated Nitrile Butadiene Rubber (HNBR), Epichlorohydrin rubber (ECO), and/or polyvinylidene fluoride.

The preform 304 may comprise a molded or shaped object that has the general shape and dimensions representing the inside volume of a fuel tank. The preform 304 is gas-permeable or gas impermeable and it may comprise a solid hard material, in that the preform preferably may support the weight of the wall portion 100 illustrated in FIG. 1 during manufacturing. Suitable materials for the preform 304 may include, but are not limited to, plaster, polyurethane, polyurea, polyester or polystyrene foams. The preform 304 may be formed to have a shape suitable for a mold or it may be cut and sculpted to a desired shape. According to some exemplary embodiments, the preform 304 may comprise a gas-permeable solid structure such as illustrated in FIG. 7A (described below) or the preform 304 may comprise a gas-impermeable hollow structure such as illustrated in FIG. 7B (described below). The inventive system 200 and method 500 may also employ foam board performs 304 as understood by one of ordinary skill in the art as an alternative to the preform material 304A, 304B used for the gas-permeable structures of FIG. 7A.

In the exemplary embodiment illustrated in FIG. 4A, the cross-sectional shape of the gas-permeable, hollow preform 304 may comprise a rectangular shape or a more complex shape. As noted above, other cross-sectional shapes are possible and are within the scope of the disclosure described herein. Other cross-sectional shapes include, but are not limited to, oval, cylindrical, triangular, hexagonal (See FIGS. 7A-7B), octagonal, and other like shapes or more complex convex and/or concave shapes that may be conducive for use as fuel tanks on military crafts and/or other vehicles, such as, but not limited to, police cars, race cards, armored vehicles, etc.

Positioned between the liner 202 and the preform 304 is an elastomeric mold release layer 302. The elastomeric mold release layer 302 may have at least two purposes. First, it may serve as an elastomeric bag that will allow gaseous pressurization from inside the perform 304. The gaseous pressure serves to expand the elastomeric mold release layer 302 and subsequently push the uncured wall 100 structure against the surfaces of mold 400A and 400B. In most cases, it is important that the elastomeric mold release layer 302 be leak tight during pressurization. Second, the elastomeric mold release layer 302 may serve as a mold release between the preform 304 and the liner 202. The elastomeric mold release layer 302 may comprise any conventional mold release material. Suitable mold release materials include, but are not limited to, silicone, elastomeric silicone, polyvinyl alcohol (PVA), polyolefin, or oil or grease mold release agents.

One of ordinary skill in the art will appreciate that the thicknesses illustrated in the cross-sectional view of FIG. 4A may have been exaggerated for viewing purposes. The thicknesses of the liner 202, the elastomeric mold release layer 302, and the preform 304 may be varied without departing from the scope of the disclosure described herein. According to one exemplary embodiment, the liner layer 202 may have a thickness of approximately 0.1 to approximately 1.0 mm, while the elastomeric mold release layer 302 may have a thickness of approximately 0.5 to approximately 2.0 mm, and the preform 304 may have a thickness of approximately 1.0 to approximately 10.0 mm. The preform 304 may be a monolithic solid structure, a hollow structure, or a layered structure, for example.

Figure 4B:
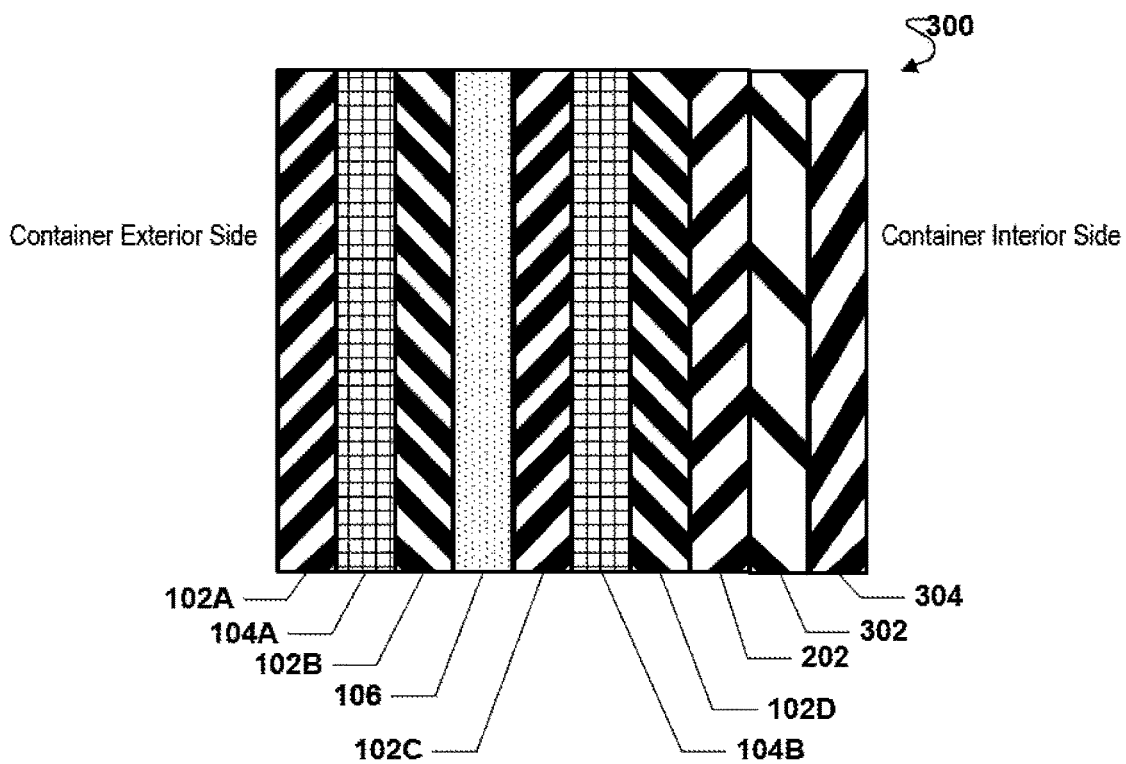
FIG. 4B is a cross-sectional view of an intermediate product that comprises the wall layers of FIG. 1 in addition to the preform, the release layer, and liner of FIG. 4A.

FIG. 4B is a cross-sectional view of an intermediate product 300 that comprises the wall portion 100 of FIG. 1 in addition to the preform 304, the release layer 302, and liner 202 as illustrated in FIG. 4A. The intermediate product 300 is characterized as such ("intermediate") because the preform 304 and elastomeric mold release layer 302 are not utilized in the end product for containing a fluid 204, such as a fuel. The illustration of the intermediate product 300 of FIG. 4A is helpful in understanding how a completed fuel tank or final product forming the wall system 200 as illustrated in FIGS. 2 and 4E-4E is manufactured.

Figure 4C:
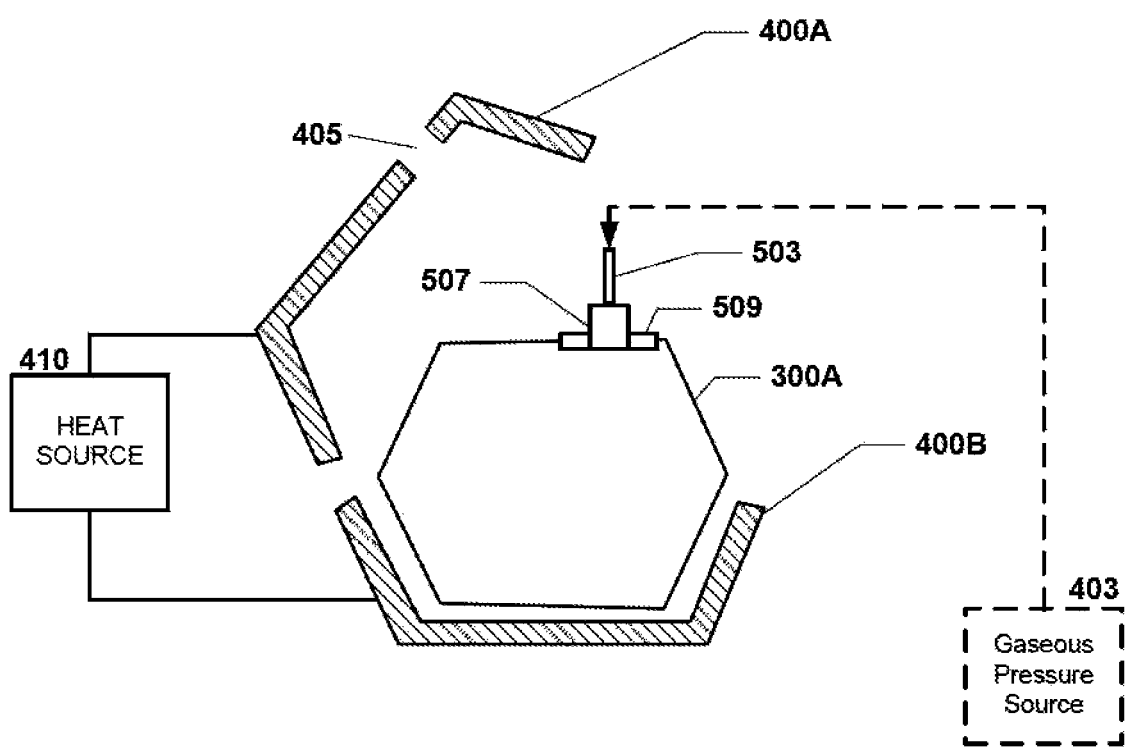
FIG. 4C is a diagram illustrating how the intermediate product of FIG. 4B is positioned within a mold according to one exemplary embodiment.

FIG. 4C is a diagram illustrating how the intermediate product 300A of FIG. 4B (which comprises the preform 304 and the elastomeric mold release layer 302 but no liquid 204) is positioned within a mold 400 and coupled to a gaseous pressure source 403 according to one exemplary embodiment. According to this exemplary embodiment, the intermediate product 300A has a hexagonal shape compared to the rectangular cross-sectional shape illustrated in FIG. 4B.

In the exemplary embodiment illustrated in FIG. 4C, the mold 400 may comprise two halves 400A, 400B which are joined together. The two halves 400A, 400 may be coupled together by any type of mechanical fastener, such as, but not limited to, a hinge. Other types of molds 400, such as a two piece compression mold 400, as well as other molding techniques may be employed such as compression molding and vacuum bag molding. The actual number of mold sections can be more than two and is dictated by each individual volume geometry requirement. The mold section design also aids in the removal of the final product once the curing is complete. The mold 400 controls the dimension of the final product, which is the wall system/self-sealable volume 200 as illustrated in FIG. 1A. Exemplary dimensions for the mold include, but are not limited to, about 499.00 mm by about 555.00 mm by about 96.50 mm (or about 19.65 inches by about 21.85 inches by about 3.80 inches). It is noted that the 19.65 inches measurement corresponds to the 19.79 inches measurement for the self sealing volume listed in Table 1 described below. It is further noted that the preform 304 does not control the final dimensions of the wall system/self-sealable volume 200.

Figure 4D:
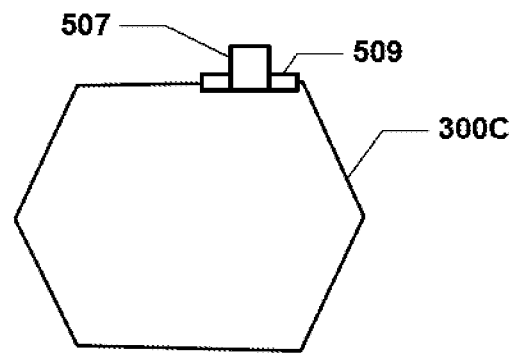
FIG. 4D is a diagram illustrating a cured intermediate product after the intermediate product is removed from the mold of FIG. 4C.
Figure 4E:
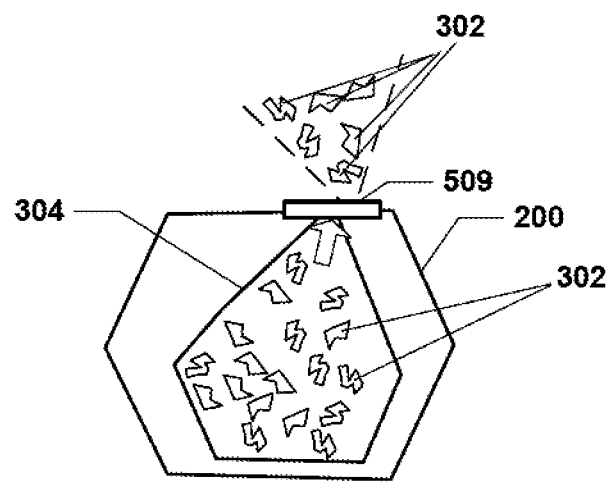
FIG. 4E is a diagram illustrating the formation of the completed product of FIGS. 2A-2F by removal of the preform and release layer.

After curing of the intermediate product 300A within the mold 400 and later removal of the preform 304 and elastomeric mold release layer 302, the cured structure forms the final wall system 200 of a self-sealing volume as illustrated in FIG. 4E and FIG. 2. The mold 400 may comprise a heat source 410 for generating heat to apply to the intermediate product 300A contained within the mold 400. A heat source 410 may comprise any type of heat appropriate for molding or curing elastomeric structures as understood by one of ordinary skill in the art. Exemplary heat sources 410 include, but are not limited to, conventional ovens, like convection ovens, microwave ovens, attached electrical strip heaters, autoclaves or attached tubing containing heated oil.

The mold 400 may also comprise a gaseous pressure source 403, like a pump, for generating gaseous pressure to apply to the intermediate product 300A contained within the mold 400. Specifically, the gaseous pressure source 403 may be coupled to an inlet 503. The inlet 503 may be coupled to a metal fixture 507 that is contained within a nut ring 509. A nut ring 509 may comprise an access port for fuel filling, venting, and a fuel pump. Each metal fixture 507 may be fitted with one nut ring 509. Multiple metal fixtures 507 with nut rings 509 may be used for redundancy and/or for different connections to the resultant self-sealing volume 100 which is designed to contain fuel.

Each self-sealing volume 100 may have one or more nut rings 509. Each nut ring 509 may be fitted with cords or fabric flanges that extend radially into the elastomeric composite 100 to provide secure attachment of the nut ring 509 to the self-sealing volume 100. A nut ring is described and illustrated in U.S. Pat. No. 3,704,190, the entire contents of which are hereby incorporated by reference. A nut ring may have a circular shape. However, it may have other shapes too, such as, but not limited to, oval, rectangular, rectangular with rounded edges, pentagonal, octagonal, etc.

A gaseous pressure source 403 may comprise any type of gaseous pressure appropriate for forming a shaped part of elastomeric structures as understood by one of ordinary skill in the art. Exemplary gaseous pressure sources 403 include, but are not limited to, compressed air from a compressed cylinder or from a conventional air compressor, or compressed nitrogen, argon, carbon dioxide or helium from a compressed cylinder.

As noted previously, the elastomeric mold release layer 302 forms a gas tight seal around the preform 304 when the elastomeric mold release layer 302 is inflated by the gaseous pressure source 403. The elastomeric mold release layer 302 will expand the elastomeric material layers 102 when the elastomeric mold release layer 302 is inflated with a gas from the gaseous pressure source 403. The amount of pressure provided by the gaseous pressure source 403 is generally between about 2.0 psi to about 80.0 psi, and preferably between about 10.0 psi to about 40.0 psi, and more preferably at about 20.0 psi. However, other pressures may be used as understood by one of ordinary skill in the art and are within the scope of this disclosure.

FIG. 4D is a diagram illustrating a cured intermediate product 300C after the intermediate product 300C is removed from the mold 400 of FIG. 4C, disconnected from the inlet 503 and gas pressure source 403, and after the intermediate product 300C has been cured. The intermediate product 300C may have any three dimensional shape including regular cubic square or rectangular cross-sectional shape or an irregular cubic quadrilateral shape or a complex multisided three dimensional shape. In the exemplary embodiment illustrated in FIG. 4D, the intermediate product 300C has a hexagonal shape.

The intermediate product 300C is characterized as such ("intermediate") because it comprises the elastomeric mold release layer 302 and the preform 304 (internally), which are not illustrated in this figure but are illustrated in FIGS. 4A-4B. The view of FIG. 4D is an external one of the intermediate product 300C such that the internal layers, such as the elastomeric mold release layer 302 and preform 304, are not visible.

FIG. 4E is a diagram illustrating the formation of the completed product 200 of FIGS. 2A-2F by removing the preform 304 and the release layer 304. The preform 304 and release layer 302 may be removed from the intermediate product 300C, as disclosed below.

The preform 304 and elastomeric mold release layer 302 may be removed after the intermediate product 300C has been fully cured and cooled. These two structures 304, 302 may be removed by breaking them into small pieces or chunks, or a single extended piece, and removing them through nut ring 509 and access port 405. The preform 304 may be smaller relative to (have outer dimensions which are less than) the finished product 200 since the preform 304 is filled with a fluid, like air, such that the mold release layer 302 expands from the fluid. The fluid may include a gas that is used while the finished product 200 is curing. The preform 304 usually does not change in size/dimensions when the fluid is provided inside the preform 304 to inflate the mold release layer 302.

Usually, the elastomeric mold release layer 302 is removed with the preform 304 illustrated in FIG. 4E. Then, the preform 304 may be removed through the nut ring 509 of the finished product 200. The nut ring 509 usually has a round shape, but other shapes may be employed as understood by one of ordinary skill in the art. Once these structures 304, 302 are completely removed, the finished and completed product 200 is formed as illustrated in FIG. 1A.

FIG. 4F1 is a cross-sectional view of a self-sealing volume 200 in the form of a fuel tank illustrating the individual composite layers along with paths 411 of air escape according to one exemplary embodiment. FIG. 4F1 has a breather structure 409. The wall system/volume 200 comprises a wall 100 and a liner 202 which will be described in more detail below. The self-sealing wall system 200 may contain a fluid 204 (See FIG. 1A), such as, but not limited to, a hydrocarbon fuel.

Other layers of the wall system or volume 200 may include a release layer 302 (which is used during formation of the volume 200 but later discarded after formation of volume 200), a fabric trilayer 407, and sealant layer 106. The sealant layer 106 usually covers the entire (100%) of the surface area for the volume 200. The sealant layer 106 is responsible for sealing any punctures in the volume 200 should a projectile strike and penetrate through the wall 100 of the volume 200. Further details of the fabric trilayer 407 will be described below in connection with FIG. 4F2. Similar to the other exemplary embodiments of the volume 200, the volume 200 of FIG. 4F1 may include a nut ring 509 as described above.

In the exemplary embodiment illustrated in FIG. 4F1, the volume 200 comprises three trilayers 407A, 407B, 407C in each corner that forms the first breather structure 409A. Specifically, the first breather structure 409A comprises the following layers along the geometrical ray AB as follows (starting from point A extending towards point B of ray AB): the release layer 302 (which is discarded after formation of the preform and prior to filling the volume 200), the liner 202, the first trilayer 407A, a second trilayer 407B, a sealant layer 106, and a third trilayer 407C.

The first breather structure 409 of the exemplary embodiment illustrated in FIG. 4F1 is formed in such a way that a first gap 479A between points C and D located on respective different sealant layers 106 is formed and filled with the second trilayer 407B. A fluid for manufacturing the volume 200, such as air, may be allowed to escape the volume 200 by following fabric path 411 which exists within trilayers 407A, 407B, and 407C. A second gap 479B is formed similarly on the other side of the first breather structure by the second trilayer 407B.

An edge portion or overlap portion O of the sealant layer 106 (which lies on top of a trilayer fabric 407) in each breather structure 409 may have a length of between about a 0.25 of an inch to about 2.00 inches. The sealant layer 106 may have a thickness of between about 0.02 of an inch to about 0.12 of an inch. The trilayer fabric layers 407 may each have a thickness between about 0.005 of an inch to about 0.03 of an inch.

The overall length (L) of the volume 200 may comprise a magnitude of about 20.0 inches, while the overall height (H) of the volume 200 may comprise a magnitude of about 10.0 inches. The volume 200 may have width dimension (not visible) having a magnitude of about 22.0 inches. As noted previously, the shape of the volume 200 may be varied without departing from the scope of this disclosure. Therefore, other magnitudes for the length (L), width, and height (H) may be possible with different geometrical shapes for the volume 200.

Further, one of ordinary skill the art will recognize that the number and size of the layers may be varied without departing from the scope of the present disclosure. That is, fewer or a greater number of layers with different thicknesses may be used for a particular embodiment without departing from the scope of the technology described herein.

In each of the figures of this disclosure, the breather structure 409 may appear to have a thickness and size which are greater than a respective side of the volume 200. In other words, each breather structure 409 may appear to be "bulging" relative to the sides of the volume 200 which do not have a breather structure 409. However, the figures of this disclosure with respect to the breather structure 409 have been greatly exaggerated. In the actual final volume 200, each breather structure 409 and its relative thickness are usually very difficult to detect with the naked eye.

FIG. 4F2 is a side view of a fabric trilayer 407 that is depicted in FIG. 4F1. The fabric trilayer 407 may comprise three layers sandwiched together: a first elastomeric material matrix layer 102 (as described above in connection with FIGS. 1-3), a fabric or fiber layer 104, and a second elastomeric material matrix layer 102. The first and second elastomeric materials 102 envelope or sandwich the fabric layer 104 therebetween. The elastomeric materials 102 have been described in detail above. In many embodiments, the two elastomeric materials 102 are absorbed into the fabric or fiber layer 104 instead of encasing/circumscribing the fabric layer 104.

Each elastomeric material/matrix layer 102 may comprise at least one each of polyurethanes, polyureas, polyurethane ureas, epoxy, polyester, silicone. Each fabric layer 104 may comprise one or more layers of fabrics made from at least one of nylon, aramid, polyester polypropylene and polyethylene. Each fabric layer 104 may also comprises cords in which each cord has a diameter of between about 0.0624 of an inch to about 0.25 an inch. Each fabric trilayer 407 may have a weight between about 2.0 oz/square yard to about 36.0 oz/square yard. The fabric types may include, but are not limited to, woven materials, non-woven materials, and knitted materials.

Figure 4I:
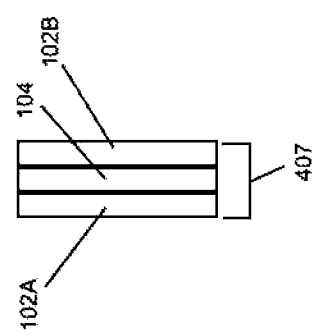
FIG. 4I is a side view of a corner of a self-sealing volume illustrating an alternative lay-up pattern where the sealant material has been perforated with holes. The sealant is subsequently covered with fabric and the holes are covered with sealant patches that are larger than the original holes. The holes can be any shape.
Figure 4I:
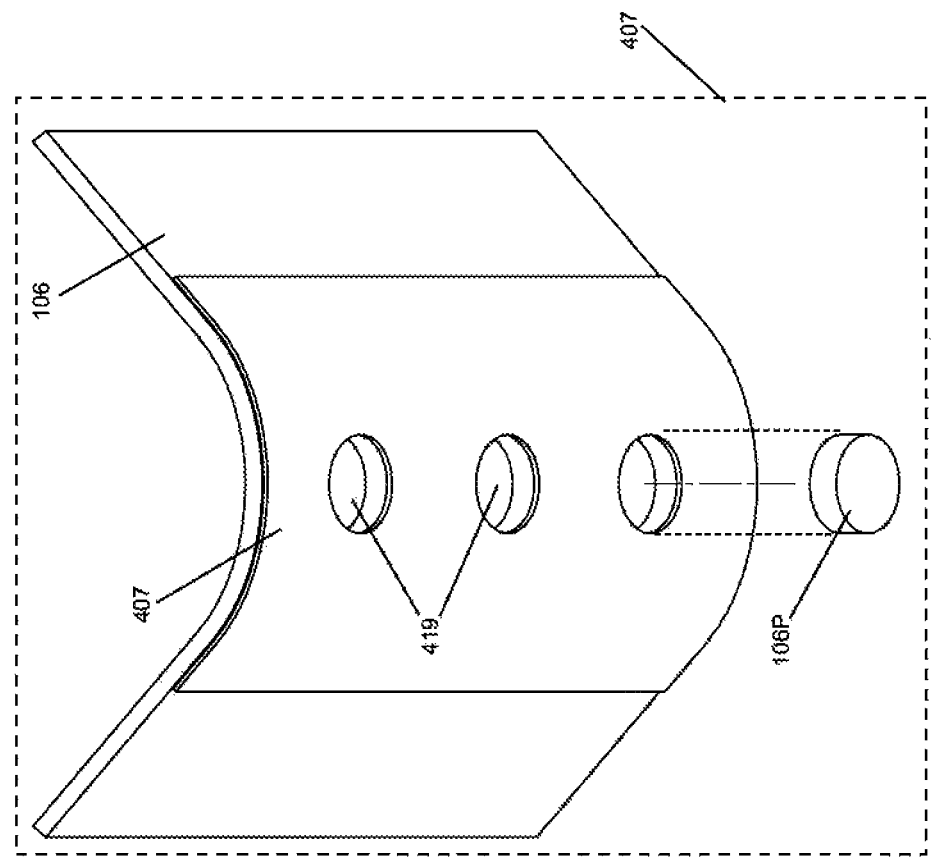
Figure 4G:
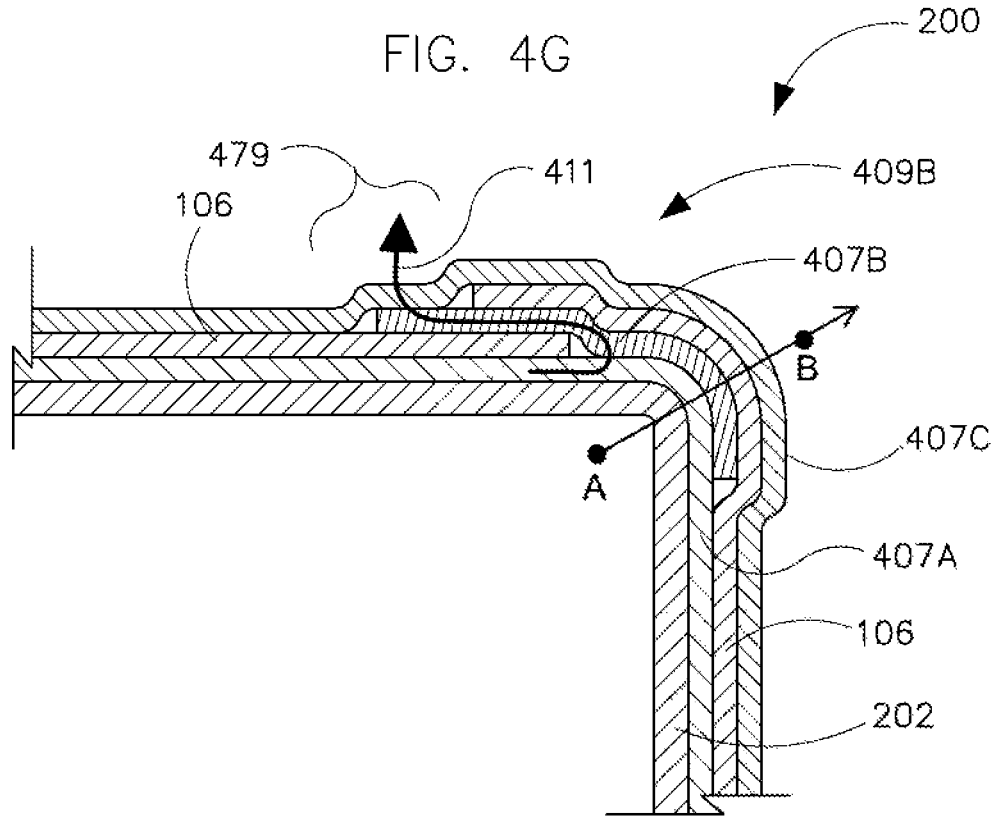
FIG. 4G is a cross-sectional view of a corner of a self-sealing volume illustrating an alternative lay up pattern where one or more structural fabric plies are located on one side of the sealant layer.

FIG. 4G is a cross-sectional view of a corner of a self-sealing volume 200 illustrating an alternative lay up pattern where one or more structural fabric plies are located on one side of the sealant layer 106. The mold release layer 302 is not present in this embodiment: it has been removed. The sequence of layers for the exemplary embodiment illustrated in FIG. 4G are as follows using geometrical ray AB as a reference for the sequence of materials that form the breather structure 409B of FIG. 4G: liner 202, a first fabric trilayer 407A, a second trilayer 407B, sealant layer 106, and a third trilayer 407C.

Relative to the first breather structure 409A illustrated in FIG. 4F1, the second breather structure 409B illustrated in FIG. 4G has only a single gap 479 formed between the two sealant layers 106 by the second fabric 407B for a respective corner region of the volume 200. A fluid or gas, like air, may flow along fabric path 411. Meanwhile, the sealant layer 106 for the first breather structure 409A has two gaps and two fabric paths 411 per corner illustrated in FIG. 4F1.

Figure 4H:
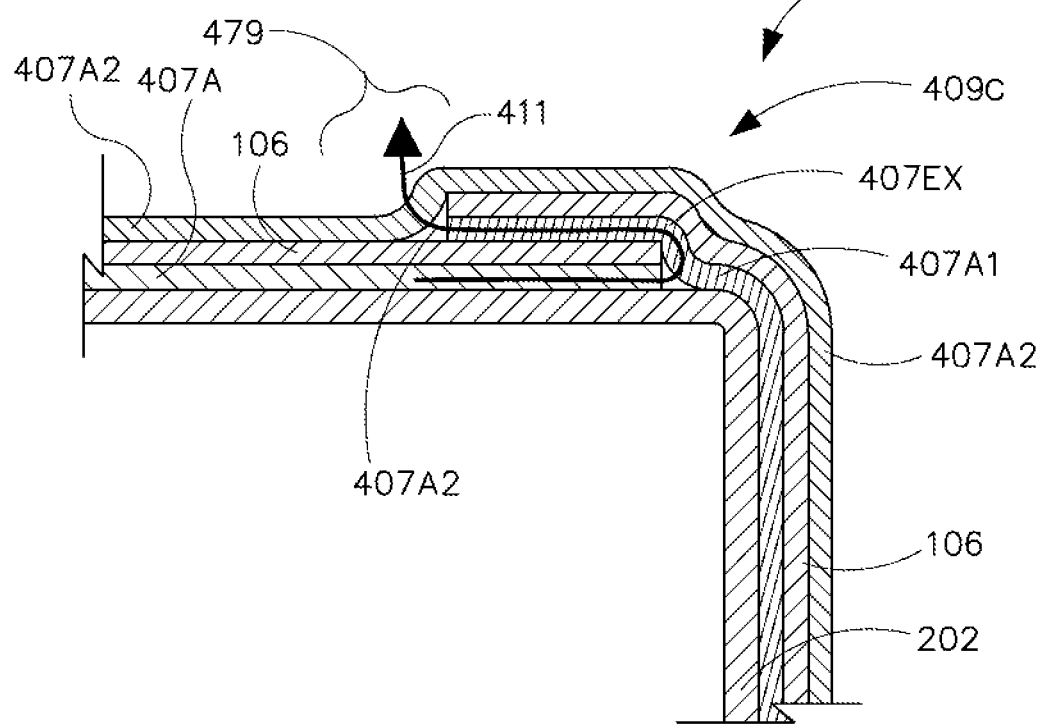
FIG. 4H is a cross-sectional view of a corner of a self-sealing volume illustrating an alternative lay up pattern where three or more structural fabric plies are separated by the sealant layer.

FIG. 4H is a cross-sectional view of a corner of a self-sealing volume 200 illustrating an alternative lay up pattern where one of the fabric layers 407A1 is extended in a continuous manner around the sealant layer 106 to meet the outer fabric layer 407A2. The mold release layer 302 is not present in this embodiment: it has been removed. Following the first fabric layer 407A1 along air escape path 411, the first fabric layer 407A1 has an extension region 407EX that continues towards the outer layer 407A2. With this configuration, another single gap 479, like the exemplary embodiment illustrated in FIG. 4G, is formed for this breather structure 409C.

FIG. 4I is a side view of a corner of a self-sealing volume 200 illustrating a view of outside layers down to the sealant layer 106 where layers inside sealant layer 106 are not shown and provide an alternative lay-up pattern where the sealant layer 106 has been perforated with apertures 419. The sealant layer 106 is subsequently covered with fabric trilayers 407A and the areas where apertures 419 are located are covered with sealant patches 106P that are larger than the original holes 419. A final fabric trilayer 407A (not illustrated) covers sealant patches 106P and fabric trilayer 407.

The apertures 419 can be any shape, such as, but not limited to, circular, elliptical, rectangular, square, slits and other similar geometric shapes. The size of the apertures 419, such as diameters for round apertures 419, may range between about 0.05 of an inch to about 1.0 inch. The sealant patches 106P and corresponding fabric trilayer 407 covering the apertures 419 are covered with a final fabric trilayer 407 as indicated with the dashed line 407 in this FIG. 1.

FIGS. 4J1-4J5 are side views of the formation of a self-sealing volume 200 using a straight wall lay-up technique in which the breather structure is located in a lateral side of the volume 200 instead of a corner of the volume 200. Any of the build configurations described in this disclosure may have breather structures located in sides of the volume 200, in corners of the volume 200, or in combinations thereof.

With a lay-up technique, the layers illustrated in each figure are applied in sequence. The elastomeric material layers 102 (part of trilayer 407) provide the necessary tack/adhesive to hold all structures together before curing. The layers in FIGS. 4J1-4J5 are applied by hand using tools such as a spatula or roller to smooth out and remove as much trapped air as possible.

Specifically, FIG. 4J1 is a side view of an intermediate self-sealing volume 200 illustrating an inner, first fabric trilayer 407 applied over a liner layer 202 (not visible in this FIG. 4J1 but see FIG. 4F1). After the first fabric trilayer 407 is applied over the liner 202, then in FIG. 4J2, a sealant layer 106 is applied.

Specifically, and referring to FIG. 4J2, a side view of an intermediate self-sealing volume 200 illustrates the sealant layer 106 applied with a gap 413 over the fabric trilayer 407 of FIG. 4J1. Within this gap 413, the fabric trilayer 407 is visible. The gap 413 may have a width dimension of between about 0.10 of an inch to about 3.00 inches. However, other widths are possible and are within the scope of this disclosure.

Referring now to FIG. 4J3, this figure is a side view of an intermediate self-sealing volume 200 illustrating a rectangular breather fabric 407R applied over the gap 413 (illustrated in FIG. 4J2). This rectangular breather fabric 407R may have a length dimension (L1) of between about 0.5 of an inch to about 4.00 inches that extends beyond gap 413 on either side of gap 413 (about 0.25 to about 1.00 inch on either side of sealant patch 106P) which usually is less than the overall length of the volume 200.

Next, FIG. 4J4 is a side view of an intermediate self-sealing volume 200 illustrating a sealant patch 106P applied over the gap 413 and rectangular breather fabric 407R of FIG. 4J3. The sealant patch 106P may have a length dimension (L2) of approximately between about 0.25 of an inch to about 1.00 incheinch that extends beyond gap 413 but less than fabric 407R on either side of fabric 407R (about 0.25 to about 1.00 inch less on either side of fabric 407R) which usually is less than the overall length of the volume 200] And FIG. 4J5 is a side view of an intermediate self-sealing volume 200 illustrating an outer, second trilayer fabric 407 applied over the sealant patch 106P and sealant 106 of FIG. 4J4.

FIGS. 4K1-4K7 are views of the formation of a self-sealing volume 200 using a calendared sealant patch technique. Specifically, FIG. 4K1 is a side view of an intermediate self-sealing volume 200 illustrating an inner, first fabric trilayer 407 positioned over a liner layer 202 (not visible in this FIG. 4K1 but see FIG. 4F1).

FIG. 4K2 is a side view of an intermediate self-sealing volume 200 illustrating the sealant layer 106A or a calendared sealant 106A applied with a gap 413 over the fabric trilayer 407 of FIG. 4K1. For forming a calendared sealant 106A, the sealant 106 is previously laminated directly to a fabric 407 by passing the sealant 106 and fabric 407, stacked together, between solid metal rolls under pressure.

The gap 413 of FIG. 4K2 may have the same dimensions described above with respect to the exemplary embodiment illustrated in FIG. 4J. Similar to FIG. 4J2 described above, within this gap 413, the fabric trilayer 407 is visible. Next, FIG. 4K3 is a side view of an intermediate self-sealing volume 200 illustrating a calendared sealant patch 106CP applied over the gap 413 and sealant 106A of FIG. 4K2. Usually, calendered sealant patch 106CP is applied so that fabric side is positioned on sealant layer 106A. The calendared sealant patch 106CP may have a length dimension (L3) of approximately between about 0.5 of an inch to about 4.00 inches that extends beyond gap 413 on either side of gap 413 (about 0.25 to about 1.00 inch on either side of gap 413)] Next, FIG. 4K4 is a side view of an intermediate self-sealing volume 200 illustrating an outer, second trilayer fabric 407 applied over the calendared sealant patch 106CP and sealant layers 106A of FIG. 4K3.

FIG. 4K5 is a cross-sectional, top view of the calendared sealant patch embodiment of FIG. 4K4. In this exemplary embodiment illustrated in FIG. 4K5, the gap or absence of material 413 between sealant layers 106A is more visible. The inner most trilayer 407A faces the inside of the volume 200 while the outermost trilayer 407B faces an outside or exterior of the volume 200. As noted previously, the gap 413 allows a manufacturing fluid, such as air, to permeate through the first trilayer 407A, through the gap 413 between the sealant layers 106 and through the calendared patch layer 106CP and outermost trilayer 407B corresponding to directional arrow A in this FIG. 4K5.

Figure 5A:
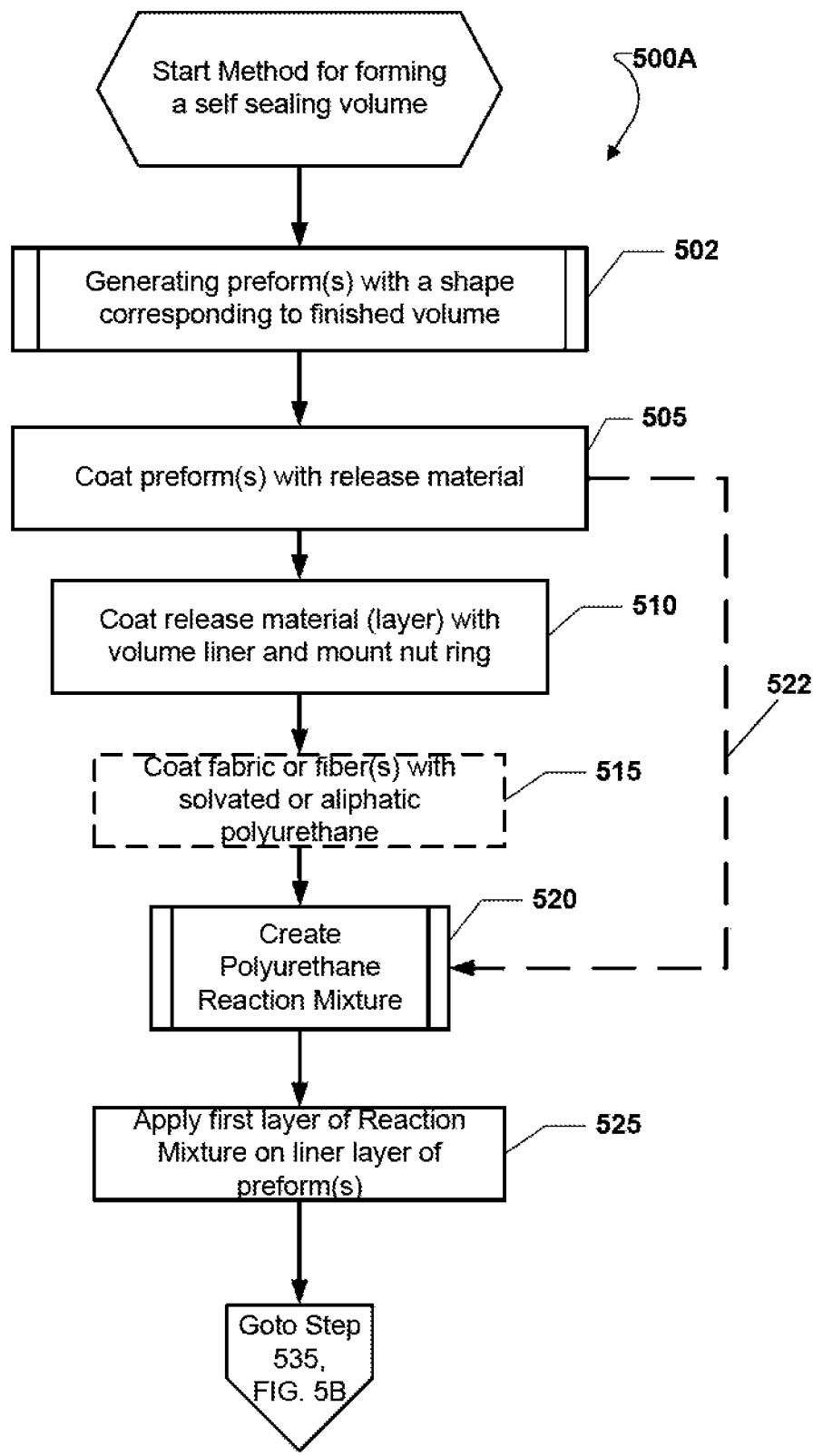
FIG. 5A is a flowchart illustrating a method for forming a self-sealing volume according to an exemplary embodiment.
Figure 5B:
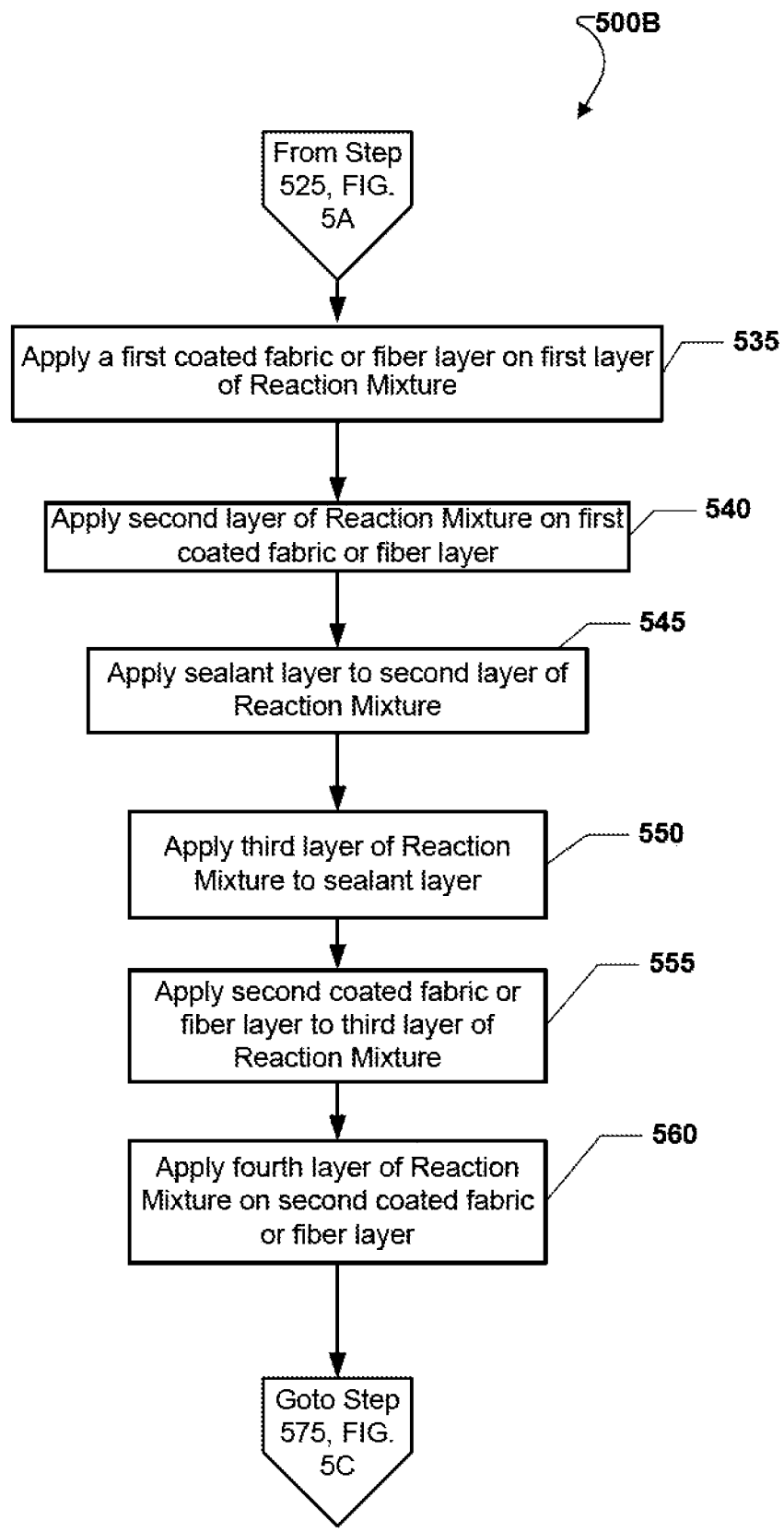
FIG. 5B is a continuation flowchart of FIG. 5A illustrating the method for forming a self-sealing volume according to an exemplary embodiment.
Figure 5C:
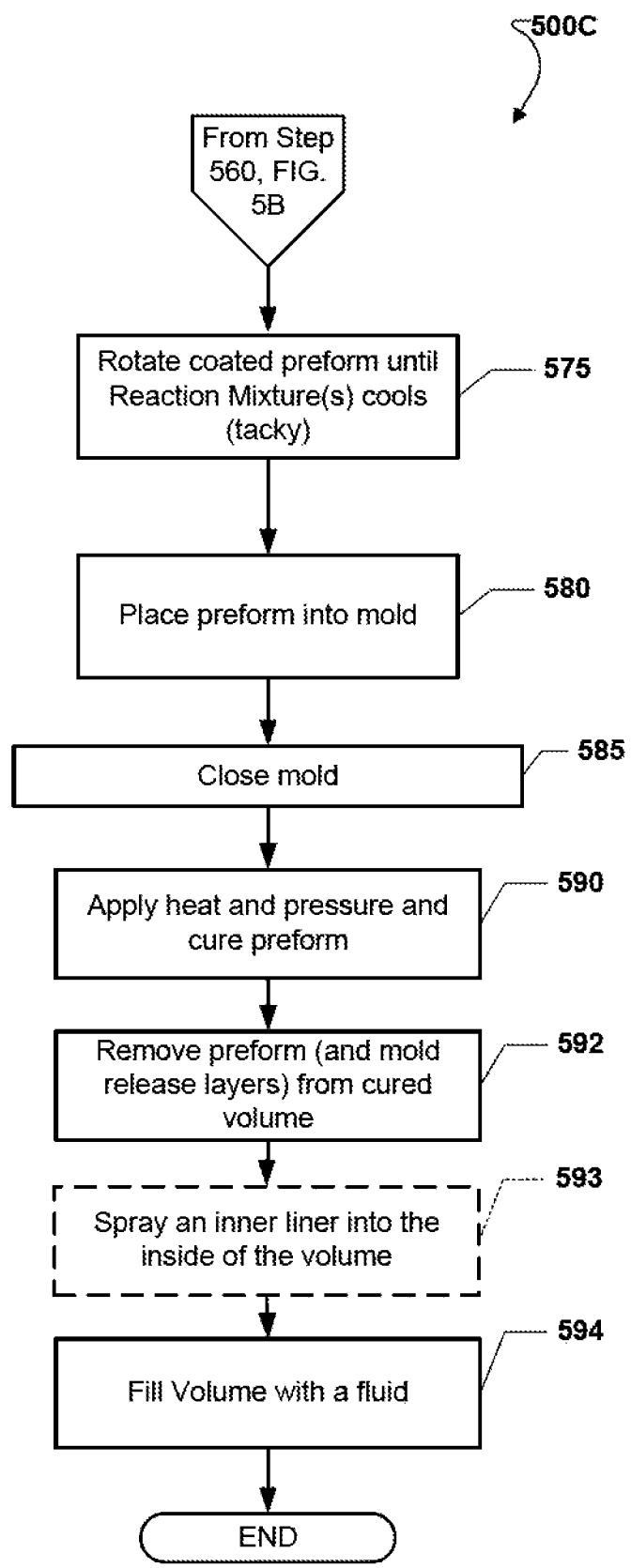
FIG. 5C is a continuation flowchart of FIG. 5B illustrating the method for forming a self-sealing volume according to an exemplary embodiment.
Figure 6:
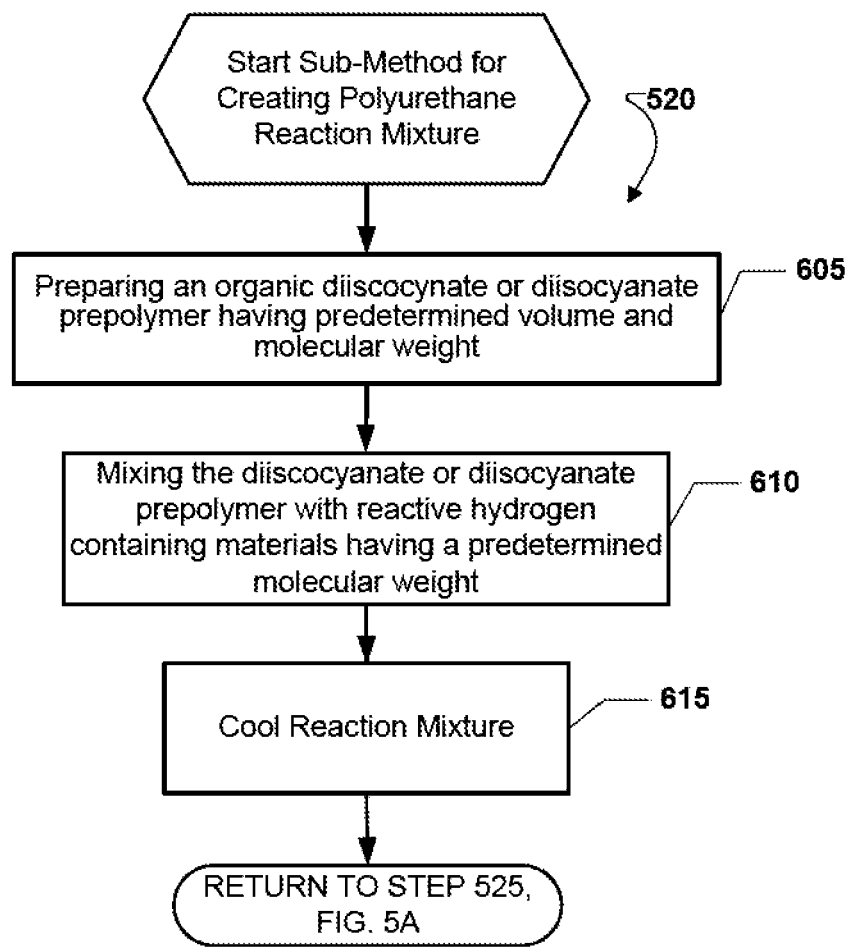

FIG. 4K6 is a side view of the calendared sealant patch 106CP of FIGS. 4K3 and 4K5 alone. FIG. 4K7 is a cross-sectional view of the calendared sealant patch 106CP illustrated in FIG. 4K6. Like the sealant layer 106 described above, the calendared sealant patch 106CP may have a thickness of between about 0.02 of an inch to about 0.3 of an inch. The calendared sealant patch 106CP may comprise a fabric 417 made of nylon, polyester, polypropylene, and an aramid having exemplary weights between about 1.0 ounces to about 32.0 ounces. The fabric can be woven, nonwoven, or knit. The sealant layer or side 106 is pressed on or calendared onto the fabric 107. Lower weight fabric may be employed such as nylon fabric having exemplary weights between about 1.0 ounce to about 12.0 ounces, and preferably, about 2.0 ounces.

FIGS. 4L1-4L5 are side views of the formation of a self-sealing volume 200 using a breather fabric strips or cords technique. FIG. 4L1 is a side view of an intermediate self-sealing volume 200 illustrating an inner, first fabric trilayer 407 positioned over a liner layer 202 (not visible in this FIG. 4J1 but see FIG. 4F1). Next, FIG. 4L2 is a side view of an intermediate self-sealing volume 200 illustrating the sealant applied with a gap 413 over the fabric trilayer 407 of FIG. 4L1. This gap 413 of FIG. 4L2 may have the same dimensions described above with respect to the exemplary embodiment illustrated in FIG. 4J. Similar to FIG. 4J2 described above, within this gap 413, the fabric trilayer 407 is visible.

FIG. 4L3 is a side view of an intermediate self-sealing volume 200 illustrating breather fabric strips 407S applied over the gap 413 illustrated in FIG. 4L2. These strips 407S may have a length dimension of approximately between about 0.25 of an inch to about 4.00 inches and a width dimension of approximately between about 0.25 of an inch to about—2.0 inches. The number of strips 407S is usually between about 4 and about 20, depending upon size.

FIG. 4L4 is a side view of an intermediate self-sealing volume 200 illustrating a sealant patch 106P applied over the gap 413 and breather fabric strips 407S, as well as portions of the sealant layer 106A of FIG. 4L3. Similar to FIG. 4J4, the sealant patch 106P may have dimensions similar to the sealant patch 106P described above in connection with FIG. 4J4. FIG. 4L5 is a side view of an intermediate self-sealing volume 200 illustrating an outer layer of the trilayer fabric 407 applied over the sealant patch 106P and sealant 106A of FIG. 4J4.

These FIGS. 4J, 4K, and 4L illustrate exemplary sequences of steps that may be taken in order to produce the breather structures 409 as illustrated in FIGS. 4F1, 4G, and 4I. However, one of ordinary skill in the art will appreciate that other steps may be taken and other sequences of steps may be made while still creating the breather structures 409 as illustrated in FIGS. 4F1, 4G, and 4I.

Referring now to FIG. 5A, this figure is a flowchart illustrating a method 500 for forming a self-sealing volume 200 according to an exemplary embodiment. Routine block 502 is the first block of method 500. In routine or sub-method block 502, a preform 304 as illustrated in FIG. 4A and further illustrated in FIGS. 7A-7B may be generated. A preform 304 typically has a three dimensional shape as illustrated in FIGS. 4C, and 7A-7B. Further details of routine block 502 will be described below in connection with FIGS. 7A-7B, and FIGS. 8-9. The preform 304 may or may not have a symmetrical shape. At the end of block 502, a metal fixture 507 is mounted within the opening 405 of the preform mold.

Next, in block 505, the preform 304 may be coated with an elastomeric mold release material 302 as illustrated in FIG. 4A. As noted previously, this elastomeric mold release material may comprise silicone, elastomeric silicone, polyvinyl alcohol (PVA) or polyolefin mold release agents. Specifically, an elastomeric release material 302, such as SMOOTH-ON-EZ-SPRAY™ SILICONE® 20 silicone (which is a 20 Shore A silicone elastomer) may be sprayed or otherwise coated over the surface of the preform 304.

In block 510, the elastomeric mold release material 302 may be coated with a volume liner 202. Liner 202 may comprise may comprise any elastomeric material that will have a greater resistance to hydrocarbon fuel 204 than a polyurethane elastomer. Exemplary materials for the liner material 202 include, but are not limited to, polyurethane, polyurea, nitrile rubber, polysulfide, polyvinylalchohol (PVA), Hydrogenated Nitrile Butadiene Rubber (HNBR), Epichlorohydrin rubber (ECO), and polyvinylidene fluoride. The inner liner 202 may comprise a polysulfide, such as PRC RAPID SEAL 655 ™ aliphatic polysulfide sold by PRC-DeSoto International, Inc. Or the liner 202 may comprise another fuel resistant elastomeric material. It can be sprayed in or on, coated or laid in as a sheet.

In block 510, a nut ring 509 may be mounted into the opening 405 of the preform mold containing the metal fixture 507 as understood by one of ordinary skill in the art. Each nut ring 509 is fitted with cords or fabric flanges that extend radially into the elastomeric composite 100 to provide secure attachment of the metal nut ring 509 to the self-sealing volume 100. These cords or fabric flanges are typically fitted on each nut ring 509 prior to starting method 500.

Alternatively, the volume 300A can be fabricated without the volume liner 202 which can be added in a subsequent step after the volume 300A is cured and the preform 304 and the elastomeric mold release layer 302 have been removed.

In an alternate exemplary embodiment, a path 522 is illustrated with a dashed line to convey that it's optional. It may be followed if the inner liner layer 202 is applied by spraying. Next, in optional block 515 (illustrated with dashed lines), the fabric or fiber layer 104 may be formed by coating the layer 104 with a solvated polyurethane. Alternatively, fabric or fiber layer 104 may be coated with a resorcinol formaldehyde resin or a solvated isocyanate.

Usually, this coating of the fiber layer 104 is completed as a separate step during manufacture of the fabric and it may not be part of the construction of the self-sealing container.

Subsequently, in routine or submethod 520, the elastomeric material layer 102 may be created. Further details of routine or submethod 520 are described below in connection with FIG. 6.

Next, in block 525, a first layer of the elastomeric material 102D as illustrated in FIG. 4B of the intermediate product 300 is applied to the liner 202. The elastomeric material 102D is also applied to fabric layer 104B. When applying the elastomeric material 102D, the elastomeric material 102D is generally applied to be as thin (but not viscous) as possible. The method 500A then continues to block 535 of FIG. 5B.

FIG. 5B is a continuation flowchart of FIG. 5A illustrating the method 500B for forming a self-sealing volume 200 according to an exemplary embodiment. In block 535, a first coated fabric or fiber layer 104B is applied to the first layer 102D of the elastomeric material 102D as illustrated in FIG. 4B. In an alternative exemplary embodiment, the elastomeric material 102D may be applied to the coated fabric 104B and then these two layers 102D, 104B may be applied to the liner layer 202 in which the elastomeric material 102D is sandwiched between the fabric layer 104B and the liner layer 202.

In block 540, a second layer of the elastomeric material 102C is applied to the first coated fabric or fiber layer 104B of FIG. 4B. In block 545, sealant layer 106 may have a primer or adhesion activator coated on prior to application. Then, the sealant layer 106 is applied to the second layer of the elastomeric material 102C as illustrated in FIG. 4B. As noted previously, the sealant layer 106 may comprise natural rubber or partially vulcanized natural rubber (NR) (having less than about 1% sulfur). Other materials that may be used include polyisoprene (IR), styrene butadiene (SBR), blends of SBR with NR or IR, and low durometer polyurethanes (approximately Shore A less than 70). In block 550, a third layer of the elastomeric material 102B is applied to the sealant layer 106.

In block 555, a second coated fabric or fiber layer 104A is applied to the third layer of the elastomeric material 102B as illustrated in FIG. 4B. In block 560, a fourth layer of the elastomeric material 102A is applied to the second coated fabric or fiber layer 104A as illustrated in FIG. 4B. The method 500B then continues to block 575 of FIG. 5C.

FIG. 5C is a continuation flowchart of FIG. 5B illustrating the method 500C for forming a self-sealing volume according to an exemplary embodiment. In block 575, the coated preform 304 having the wall structure illustrated in FIG. 4B is rotated so that the elastomeric material remains uniform throughout the fabric and over the preform 304 until the elastomeric material layers 102 cool and become stiff Next, in block 580, the coated preform 304 comprising the intermediate products 300A as illustrated in FIG. 4C is placed into a mold 400.

Subsequently, in block 585, the preform 304 forming the intermediate products 300A is closed within the mold 400 as illustrated in FIG. 4C. In block 590, heat and pressure may be applied to the mold 400 from heat source 410 and gas pressure source 403 in order to cure the preform 304 or intermediate product 300A to form the cured, single intermediate product 300C as illustrated in FIG. 4D. The gas pressure source 403 may fill the preform 304 and exit it while to expand the mold release layer 302 such that layer 302 pushes the composite wall structure/system 100 against the heated mold 400 during curing. Specifically, the gas pressure source 403 may inflate the elastomeric mold release layer 302 that is on the outside of the gas-permeable preform 304 so that the wall structure 100 (FIG. 1B) is pressed against the heated mold 400. Once the structure 300A of FIG. 4C cures into structure 300C of FIG. 4D, the fixture 507 may be removed from the nut ring 509.

In block 592, the inlet 503, metal fixture 507, preform 304 and corresponding elastomeric mold release layer 302 attached thereto may then be removed from the resultant cured volume 300C as illustrated in FIG. 4E to form the completed wall system or self-sealing volume 200 as illustrated in FIG. 4E. Specifically, the preform 304 and corresponding elastomeric mold release layer 302 may be broken into small pieces relative to the entire cured volume or wall system 200 and removed through nut ring 509 that penetrates through the volume formed by the wall system 200 as illustrated in FIG. 4E.

Next in block 593, if a volume liner 202 was not added in block 510, a volume liner 202 can be sprayed into the completed volume 300C so that a liquid impermeable coating completely covers the inside of the volume 300C. Liner 202 may comprise any elastomeric material that will have a greater resistance to hydrocarbon fuel 204 than a polyurethane elastomer. Exemplary materials for the liner material 202 include, but are not limited to, polyurethane, nitrile rubber, polysulfide, polyurea, polyvinylalchohol (PVA), Hydrogenated Nitrile Butadiene Rubber (HNBR), Epichlorohydrin rubber (ECO) and polyvinylidene fluoride.

Next, in block 594, the volume formed by the wall system 200 may be filled with a fluid For example, the fluid may comprise a hydrocarbon fuel, such as gasoline or diesel. The method 500 then ends after block 594.

FIG. 6 is a flowchart illustrating a routine or submethod 520 for creating a elastomeric material layer 102 according to an exemplary embodiment. Block 605 is the first step of submethod or routine 520.

In block 605, an organic diisocyanate or diisocyanate prepolymer having a predetermined molecular weight is prepared. Normally, any of the well-known organic polyisocyanates useful for making castings may be utilized for the elastomeric material layer 102. Toluene diisocyanate and methylene diphenyldiisocyanate are suitable exemplary materials as they are frequently used for making castings.

The amount of polyisocyanate used is about 0.9 to about 1.5 mole equivalents. The molecular weight that may be used for the organic diisocyanate may comprise a magnitude of approximately 250 g/mole. For a diisocyanate prepolymer, the magnitude may comprise approximately 624 g/mode or a free isocyanate percentage of between about 6.45 to about 6.74 percent.

Then, in block 610, the diisocyanate or diisocyanate prepolymer is mixed with a reactive hydrogen containing material having a predetermined molecular weight. Specifically, a reactive hydrogen-containing material having a molecular weight of about 700 to about 4000 may be used. Representative of the reactive hydrogen-containing materials are the broad classes of polyester polyols, polyether polyols, hydrocarbon-polyols. The polyester polyols that are preferred are the esters of adipic acid with the lower glycols such as ethylene glycol, propylene glycol, and butylene glycol, and mixtures of these. The polyether polyols that are preferred are propylene ether glycol, polypropylene ether polyol, and polytetramethylene ether polyol.

In conjunction with the polyol a short chain glycol, organic diamine, polyetheramine or alkylanolamine may be used to increase molecular weight of the polyurethane reaction mixture layer 102. Representative members of these classes of materials include, but are not limited to, ethylene glycols, propylene glycols, butane diols, methylene bis-chloroaniline, methylene dianiline, bis-amino phenyl sulfone and amino methyl propanol. If organic amines are used, then urea linkages will be created rather than urethane linkages, resulting in a mixed polyurethane urea.

Then, in block 615, the reaction product/layer 102 at this stage is not allowed to cure completely but it is allowed to cool after casting thereby stiffening. This is accomplished by keeping the polyurethane reaction mixture below the temperature at which curing will occur, typically below about 90° C. to about 150° C., and preferably below about 90° C. The polyurethane reaction mixture in block 615 may be applied to the preform at a temperature of between about 40.0° C. to about 75.0° C. As it cools, the reaction product will stiffen and become gel-like in a time period of between about 20.0 minutes to about 60.0 minutes, and preferably in about 20.0 minutes. The submethod then returns to block 525 of FIG. 5A.

Referring now to FIG. 7A1, this figure illustrates a cross-sectional view of a device 400C, 400D for forming flexible molds 400E, 400F according to an exemplary embodiment. The device 400C, 400D may comprise two flexible molds shells that are used to create flexible molds 400E, 400F. In the exemplary embodiment illustrated in FIG. 7A1, the two mold shells have the cross-sectional shape of one half of geometric hexagon. As noted previously, inventive method and system are not limited to the shapes described or illustrated in this disclosure. Other shapes are possible as understood by one of ordinary skill in the art.

The two rigidmolds shells 400C, 400D may comprise materials such as, but not limited to plaster, wood, molded plastic, clay, fiberglass composite, etc. One of the mold shells 400C, 400D may comprise an aperture or opening 405 such as mold shell 400D. This opening 405 will be used for a fixture 507 as will be described in further detail below.

As mentioned previously, FIGS. 7A and 7B illustrate one of several options for producing a preform. Other options/embodiments covered by this disclosure, but not illustrated, include three dimensional preform molds cut from a block of polyethylene, polystyrene foam or other similar material. In these other, alternative embodiments, the preform molds may be rigid (not flexible) as understood by one of ordinary skill in the art.

As illustrated in FIG. 7A1, the flexible molds 400E, 400F will generally have a shape that corresponds to the shape of the two rigid mold shells 400C, 400D. The flexible molds 400E, 400F previously made of a material such as, but not limited to, silicone, polyethylene, or polypropylene.

FIG. 7A2 is a cross-sectional view of the flexible molds 400E, 400F formed from the device 400C, 400D of FIG. 7A1 according to an exemplary embodiment. According to this exemplary embodiment, the two rigidmolds shells 400C, 400D have been removed so that only the flexible molds 400E, 400F each having one half of a hexagonal cross-sectional shape remain. As noted previously, one of the flexible molds 400F has an opening 405.

FIG. 7A3 is a cross-sectional view of preform material 304A, 304B positioned within the flexible molds 400E, 400F of FIG. 7A2 according to an exemplary embodiment. According to this exemplary embodiment, the preform material 304A, 304B will form a gas-permeable, solid structure. The preform material 304A, 304B may be generated by mixing equal parts of a diisocyanate such as sold under the tradename SMARTFOAM A and a polyol such as SMARTFOAM B. These mixtures are poured into the fabricated two piece molds 400E, 400F that usually have inside dimensions which correspond to the required outside dimensions of the preform 304. Once the preform material 304B of the mold 400F cures slightly (or prior to pouring of the preform material 304B) the mold 400F may be fitted with a metal fixture 507.

The metal fixture 507 of FIG. 7A3 will provide ingress for air and will serve as a mounting for the preform 304 during layup. The location of the metal fixture 507 is selected to coincide with the location of a nut ring 509 in the finished self-sealing volume 100.

FIG. 7A4 is a cross-sectional view of the two halves of a gas-permeable, solid preform 304A, 304B generated from the flexible molds 400E, 400F of FIG. 7A3 according to an exemplary embodiment. In this exemplary embodiment, the flexible molds 400E, 400F have been removed such that the gas-permeable, solid preform halves 304A, 304B remain. The second half 304B has the metal fixture 507 as described above. These halves 304A, 304B may be rotated as indicated by the directional arrows until completely cured. Rotation may or may not be used. In other embodiments, the halves 304A, 304B are not rotated. The material described above for the performs 304A, 304B generally cure at standard room temperature and pressure as understood by one of ordinary skill in the art.

FIG. 7A5 is a cross-sectional view of the two halves of the gas-permeable, solid preform 304A, 304B put/mated together according to an exemplary embodiment. The fully cured, two halves 304A, 304B are mated together by adhesives. Usually, adhesives that do not contain solvent or water may be employed. Such adhesives include, but are not limited to, epoxies or two part urethanes.

The resultant gas-permeable solid preform 304D may be characterized as a urethane preform 304D. This FIG. 7A5 also illustrates a coating 707 that may be applied to the preform surface to provide a smooth, rigid surface for build-up. Materials used for the coating 707 may include, but are not limited to, a rigid polyurethane such as FEATHERLITE® brand low-density urethane casting resin.

FIG. 7A6 is a cross-sectional view of the gas-permeable, solid preform 304D after apertures or holes 701 have been created within the preform 304D according to an exemplary embodiment. Any number of holes 701 may be created within the solid preform 304D. The holes 701 may be created with machines such as, but not limited to, drills or lasers. The holes 701 may be randomly positioned or positioned at evenly spaced intervals as understood by one of ordinary skill in the art. The holes 701 will help a fluid originating from the gaseous pressure source 403 to exit the preform 304D in order to properly inflate the release layer 302 as described above. Holes 701 are usually only needed if an impermeable skin (i.e. like FEATHERLITE® brand low-density urethane casting resin) is applied to the outside of the foam/solid preform 304D but can be used in any foam/solid preform 304D. Holes 701 are also usually needed in closed-cell foams forming the preform 304D which generally do not require the use of an outer shell (i.e like FEATHERLITE® brand low-density urethane casting resin). The depth of the holes 701 only need to penetrate the FEATHERLITE® brand low-density urethane casting resin, or close-cell foam skin but can penetrate further into the foam. The foam has pores which may connect to the holes 701. An open cell foam used for the solid preform 304D may not require any holes 701 in some instances.

The outer surface of the solid preform 304D may be sanded and finished to the desired internal dimension that may be used for the self sealing volume 100 once formed, as understood by one of ordinary skill in the art. "Finished," as described herein, means to sand and smooth so as to remove cracks, seams and imperfections as understood by one of ordinary skill in the art.

Referring now to FIG. 7B1, this figure illustrates a cross-sectional view of a solid mold 400G, 400H for forming a gas-impermeable, hollow preform 304C according to an exemplary embodiment. This solid mold 400G, 400H is "solid" in the sense that its walls may comprise a solid material. However, the solid mold 400G, 400H may comprise a hollow interior 400Z so that a hollow type preform 304C (SEE FIG. 7B5) may be generated. The solid molds 400G and 400H are part of the submethod 502B described below in FIG. 9. Submethod 502B may comprise a form of roto casting (also known as rotacasting) as understood by one of ordinary skill in the art. Such rotacasting may use self-curing resins in unheated molds, and may share slow rotational speeds that are in common with rotational molding.

Similar to the exemplary embodiment illustrated in FIG. 7A, a portion, such as one half, of the solid mold 400G, 400H may comprise an opening 405 for receiving the fixture 507 (described above). The solid mold 400G, 400H may be made from materials such as metal, composites, etc. which can withstand curing temperatures for the hollow preform 304C (illustrated in FIGS. 7B5, 7B6).

FIG. 7B2 is a cross-sectional view of the solid mold 400G, 400H of B1 with a fixture 507 attached to a side 400G of the solid mold having an opening 405 according to an exemplary embodiment. The fixture 507 illustrated in FIG. 7B2 is similar to the one illustrated in FIG. 7A.

FIG. 7B3 is a cross-sectional view of the solid mold 400G, 400H in which a liquid state of preform material 304C is poured into the solid mold 400G, 400H via the fixture 507 according to an exemplary embodiment. The fixture 507 may receive a nozzle 503. The nozzle 503 may dispense the liquid state of the preform material 304C. The liquid state of the preform material 304C may comprise a material similar to the embodiment described in FIG. 7A. Specifically, the liquid state of the preform material 304C may comprise equal parts of a diisocyanate such as sold under the tradename FEATHERLITE Part A and a polyol such as FEATHERLITE Part B. The amount of diisocyante used generally comprises enough to coat the mold and provide a uniform preform thickness of between about 1.0 mm to about 10.0 mm.

FIG. 7B4 is a cross-sectional view of the solid mold 400G, 400H containing the preform liquid material 304C while the solid mold 400G, 400H is being rotated according to an exemplary embodiment. Specifically, after a requisite amount of liquid preform material 304C is deposited in the solid mold 400G, 400H, the fixture 505 is sealed and the solid mold 400G, 400H is rotated such that the preform material 304C cures in attaches to the inner volume of the solid mold 400G, 400H in order to generate a gas-impermeable, hollow type preform 304C. The material described above for the perform 304C generally cures at standard room temperature and pressure as understood by one of ordinary skill in the art.

FIG. 7B5 is a cross-sectional view of the solid mold 400G, 400H being opened after curing of the preform liquid material 304C into a gas-impermeable, hollow preform 304C according to an exemplary embodiment. The hollow preform 304C retains the fixture 507 after curing. The hollow preform 304C may have thickness which ranges between about 1.0 mm and about 10.0 mm.

FIG. 7B6 is a cross-sectional view of the gas-impermeable, hollow preform 304C after apertures or holes 701 have been created within the preform according to an exemplary embodiment. Any number of holes 701 may be created within the hollow preform 304C. The holes 701 may be created with machines such as, but not limited to, drills or lasers. The holes 701 may be randomly positioned or positioned at evenly spaced intervals as understood by one of ordinary skill in the art. The holes 701 will help a fluid originating from the gaseous pressure source 403 to exit the preform 304D in order to properly inflate the release layer 302 as described above.

The outer surface of the hollow preform 304C may be sanded and finished to the desired internal dimension that may be used for the self sealing volume 100 once formed, as understood by one of ordinary skill in the art. "Finished," as described herein, means to sand and smooth so as to remove cracks, seams and imperfections as understood by one of ordinary skill in the art.

Figure 7C:
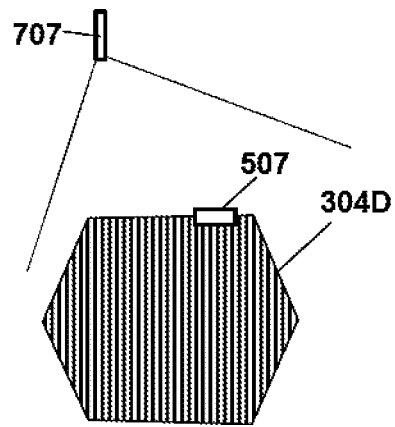
FIG. 7C illustrates a cross-sectional view of a device for forming flexible molds according to an exemplary embodiment.
Figure 7C:
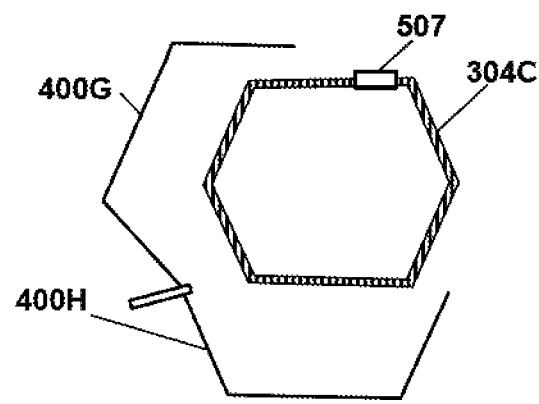
Figure 7C:
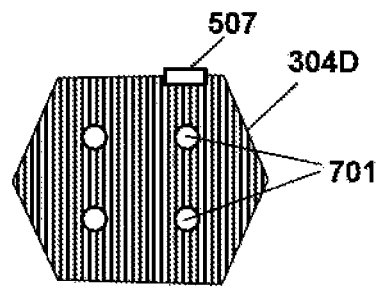
Figure 7C:
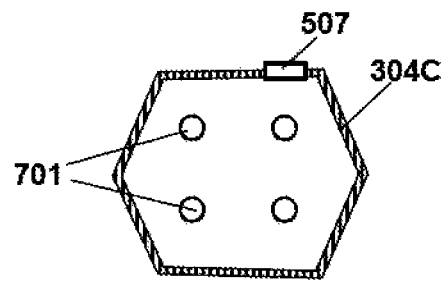
Figure 7C:
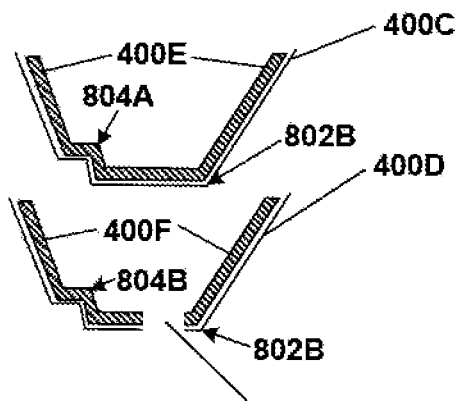

FIG. 7C is a cross-sectional view of a device for forming flexible molds according to another exemplary embodiment.

Referring now to FIG. 7C, this figure illustrates a cross-sectional view of a device 400C, 400D for forming flexible molds 400E, 400F according to an exemplary embodiment. This figure is similar to FIG. 7A1 described above.

The device 400C, 400D may comprise two flexible molds shells that are used to create flexible molds 400E, 400F. The flexible mold shells 400C, 400D may comprise a combination of convex and concave geometries. For example, see convex regions 802A,B and concave regions 804A,B. Additional and/or fewer convex regions 802A,B and concave regions 804A,B may be provided without departing from the scope of this disclosure. Further, these convex regions 802A,B and concave regions 804A,B may be added to all molds described in this disclosure, such as those illustrated in FIG. 7B.

With the inventive wall system resulting from the molds described above, a complex three dimensional volume 200 may be generated which may or may not contain concave geometries 802, 804. Meanwhile, as understood by one of ordinary skill in the art, conventional and prior art mold systems may only produce convex geometries and not concave geometries as described above and illustrated in FIG. 7C. Conventional and prior art mold systems usually cannot produce concave geometries and/or a combination of convex and concave geometries in a final product, such as a self-sealing volume.

Figure 8:
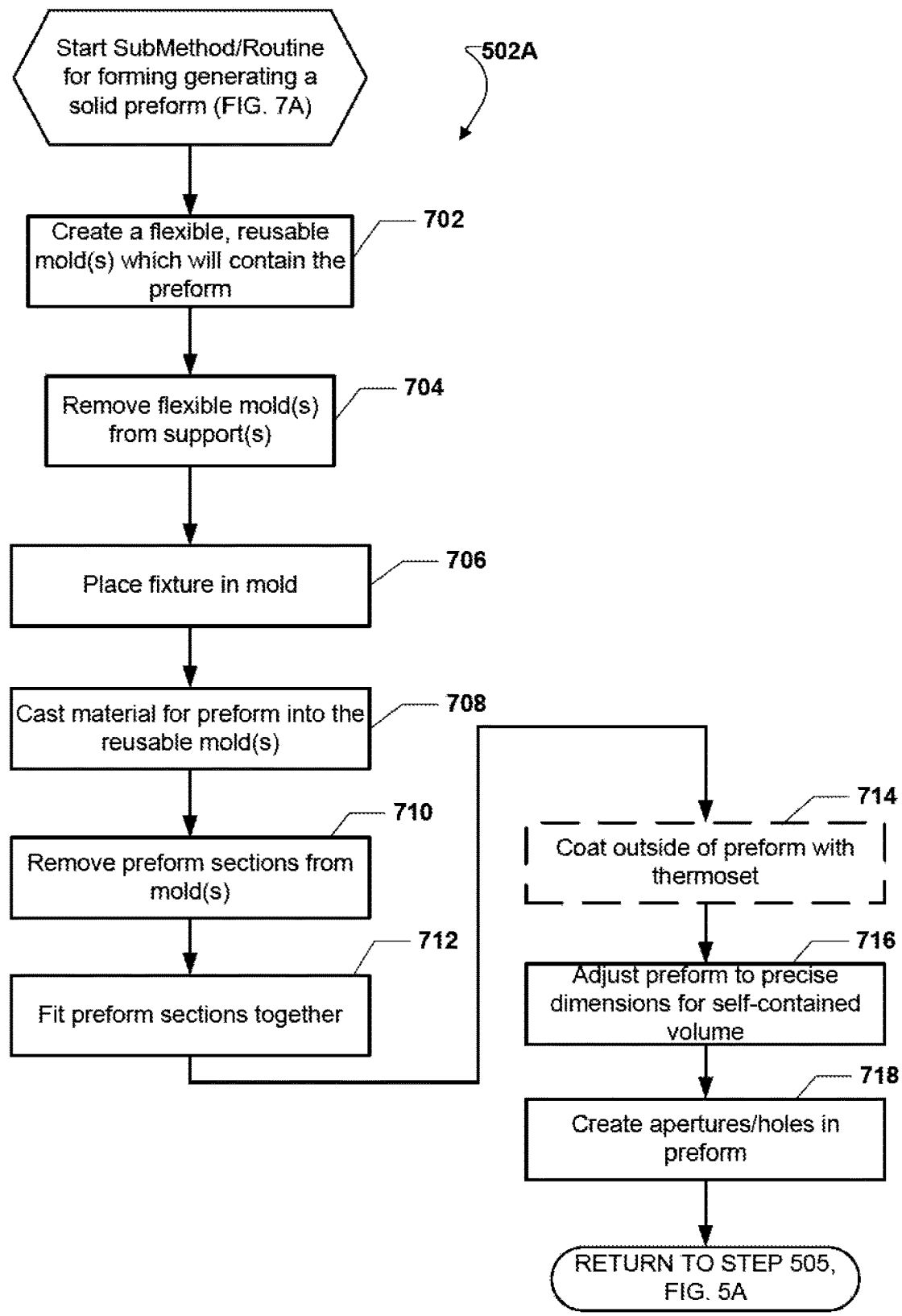
FIG. 8 is a flowchart illustrating a routine or submethod for generating the solid preform of FIG. 7A according to an exemplary embodiment.
Figure 9:
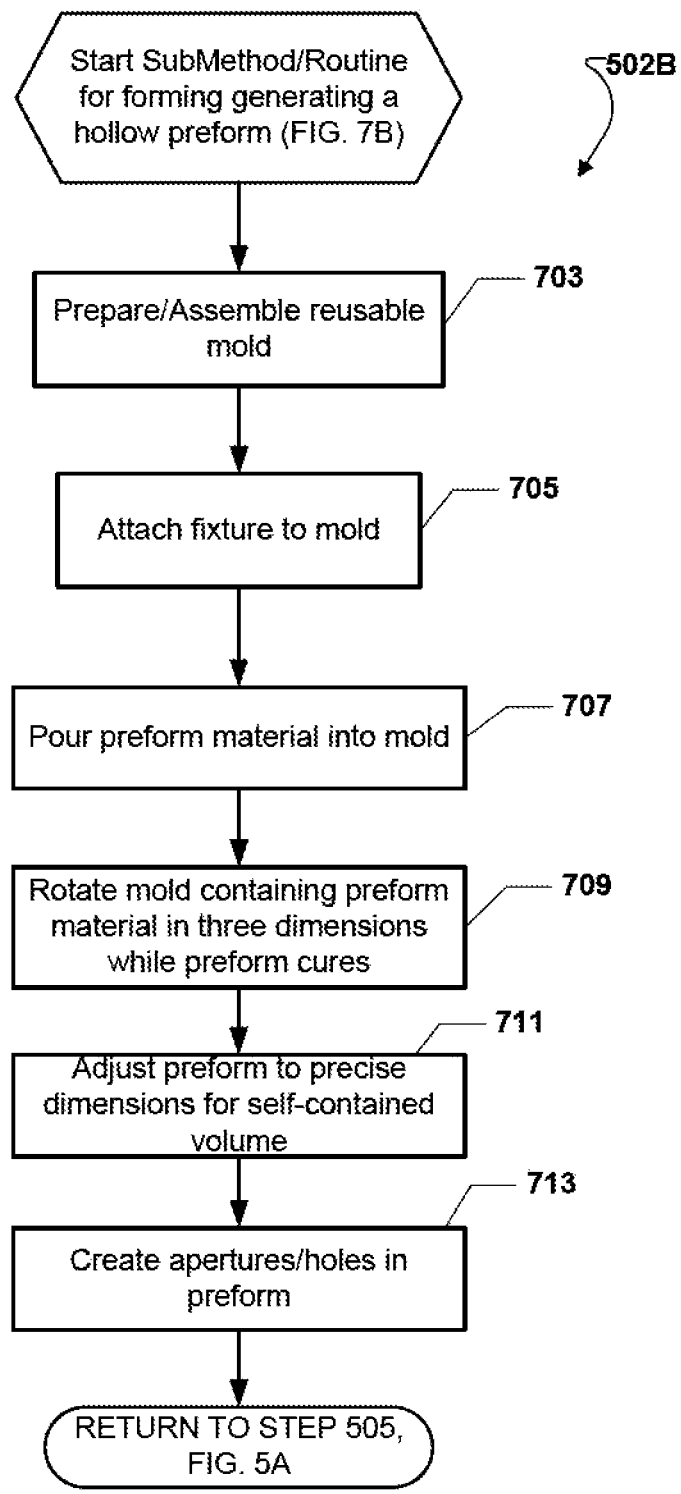
FIG. 9 is a flowchart illustrating a routine or submethod for generating the hollow preform of FIG. 7B according to an exemplary embodiment.

FIG. 8 is a flowchart 502A illustrating a routine or submethod 502A for generating the solid preform 304D of FIG. 7A according to an exemplary embodiment. Block 702 is the first step of routine 502A. This routine 502A corresponds with routine 502 described above in connection with FIG. 5A. As mentioned previously, routine 502 of FIG. 5A may have at least two different paths or methods, such as illustrated in FIG. 8 and FIG. 9.

In block 702 of FIG. 8, a flexible, reusable mold 400E, 400F as illustrated in FIGS. 7A1-A3 is created. The flexible, reusable mold 400E, 400F may be created with the use of supports or mold forms 400C, 400D as set forth in FIG. 7A1. The flexible, reusable mold 400E, 400F, once created, may be used to generate a preform 304.

In block 704, the flexible, reusable mold 400E, 400F is removed from supports 400C, 400D as illustrated in FIG. 7A2. In block 706, a fixture 507 may be positioned within an aperture 405 of a portion of the flexible, reusable mold 400E, 400F, such as in flexible mold 400F as illustrated in FIG. 7A3. The fixture 507 is positioned before the material for the preform 304B hardens.

In block 708, the material for the preform 304 is cast into the flexible, reusable mold 400E, 400F such as illustrated in FIG. 7A3. In block 710, the hardened preform materials forming preform sections 304A, 304B may be removed from the flexible and reusable mold 400E, 400F as illustrated in FIG. 7A4. Next, in block 712, the preform sections 304A, 304B may be fitted together and coupled permanently with the use of adhesives as illustrated in FIG. 7A5.

In optional block 714, the outside of or external layer of the preform 304D may be coated with a thermoset layer as illustrated in FIG. 7A5 with the nozzle 707 dispersing a coating. Next, in block 716, the preform 304D may be adjusted to precise dimensions that will correspond to the self-contained volume 100 described above. Specifically, in this block 716, adjusting may include sanding, buffing, cutting, shaving, and the like, to the preform 304D. Subsequently, in block 716, apertures/holes 701 may be created within the solid, gas-permeable preform 304D. The process then returns to block 505 of FIG. 5A.

FIG. 9 is a flowchart illustrating a routine or submethod for generating the hollow preform 304C of FIG. 7B according to an exemplary embodiment. Block 703 is the first step of routine 502B. This routine 502B corresponds with routine 502 described above in connection with FIG. 5A. As mentioned previously, routine 502 of FIG. 5A may have at least two different paths or methods, such as illustrated in FIG. 8 and FIG. 9.

In block 703 of FIG. 9, the reusable mold 400G, 400H such as illustrated in FIG. 7B1 may be assembled/prepared. This reusable mold 400G, 400H may produce hollow performs 304C as described above.

In block 705, a fixture 507 may be positioned within the reusable mold 400G, 400H. Specifically, one section 400G of the reusable mold 400G, 400H may have an aperture for receiving a fixture 507.

In block 707, preform material 304C may be poured in a liquid state from a nozzle 509 to the inside of the reusable mold 400G, 400H such as illustrated in FIG. 7B3. Next, in block 709, the reusable mold 400G, 400H may be sealed and then rotated in three dimensions while the liquid preform material 304C cures against the inside or internal wall of the reusable mold 400G, 400H.

In block 711, the hollow, gas-permeable preform 304C may be removed from the reusable mold 400G, 400H. The hollow gas-impermeable preform 304C may be adjusted to precise dimensions corresponding to the self-contained volume 100. Specifically, in this block 711, adjusting may include sanding, buffing, cutting, shaving, and the like, to the preform 304C. Subsequently, in block 713, apertures/holes 701 may be created within the hollow, gas-impermeable preform 304D. The process then returns to block 505 of FIG. 5A.

Elastomeric Material 102 —Example 1

39 parts of a polyester polyol such as Baytec GSV 85A (which is a 2,000-molecular-weight polyethylene/polybutylene adipate diol) having a hydroxyl number of 55 were premixed with a 5 parts of butane diol at a temperature of about 50° C. To this polyol mixture, 100 parts of a polyester pre-polymer such as Baytec 242 (which is a modified diphenylmethane diisocyanate (MDI)-terminated polyester prepolymer), was added at a temperature of about 50° C. and mixed. The resulting polyurethane reaction mixture 102D was spread onto a foam polyurethane preform 304 that had been previously coated with a layer 302 of Smooth On EZ Spray SILICONE® 20 silicone (which is a 20 Shore A silicone elastomer) and a layer of inner liner 202 made from a polysulfide such as PRC Rapid Seal 655 aliphatic polysulfide sold by PRC-DeSoto International, Inc.

Next about a 24 oz NYLON fabric 104B that had been previously coated and dried with a solvated polyurethane, namely Estane 5714, an aliphatic polyurethane, or a polyether type thermoplastic polyurethane, was placed on the preform 304. This was followed by another layer of the same polyurethane reaction mixture 102C. Next, a layer of partially vulcanized natural rubber having less than about 1% sulfur, forming the sealant layer 106 was applied followed by adding another layer of the same polyurethane reaction mixture 102B. Subsequently, a layer of polyurethane coated 24 oz NYLON fabric 104A and a final layer of the same polyurethane reaction mixture 102A were applied.

The resulting "wet" composite of intermediate fuel tank 300 was rotated and turned until the polyurethane reaction mixture layers 102 cooled to yield a tacky but intractable coating. At this stage, the fuel tank was placed in one half of a three dimensional mold 400. The second half 400A of the mold was closed onto the first half 400B and the fuel tank 300A, 300B was cured for at least about 90.0 minutes at a temperature of about 120° C. and an air pressure of about 20 psi from the gaseous pressure source 403.

Elastomeric Material 102 —Example 2

39 parts of a polyester polyol such as Baytec GSV 85A (which is a 2,000-molecular-weight polyethylene/polybutylene adipate diol) having a hydroxyl number of 55 were premixed with a 4 parts of propane diol at a temperature of about 50° C. To this polyol mixture, 100 parts of a polyester pre-polymer such as Baytec 242 (which is a modified diphenylmethane diisocyanate (MDI)-terminated polyester prepolymer) were added at a temperature of about 50° C. and mixed. The resulting polyurethane reaction mixture 102D was spread onto a foam polyurethane preform 304 that had been previously coated with a layer 302 of Smooth On EZ Spray SILICONE® 20 silicone (which is a 20 Shore A silicone elastomer) and a layer of inner liner 202 made from a polysulfide, such as PRC Rapid Seal 655 aliphatic polysulfide sold by PRC-DeSoto International, Inc.

Next, about a 24 oz NYLON fabric 104B that had been previously dried and coated with a solvated polyurethane, namely Estane 5714, an aliphatic polyurethane, or a polyether type thermoplastic polyurethane, was placed on the preform 304. This was followed by adding another layer of the same polyurethane reaction mixture 102C. Subsequently, a layer of partially vulcanized natural rubber having less than about 1% sulfur, forming sealant layer 106 was applied followed by another layer of the same polyurethane reaction mixture 102B. Subsequently, a layer of polyurethane coated 24 oz NYLON fabric 104A and a final layer of the same polyurethane reaction mixture 102A were applied.

The resulting "wet" composite of intermediate fuel tank 300 was rotated and turned until the polyurethane reaction mixture layers 102 cooled to yield a tacky but intractable coating. At this stage, the fuel tank was placed in one half of a three dimensional mold 400. The second half 400A of the mold was closed onto the first half 400B and the fuel tank 300A, 300B was cured for at least about 90.0 minutes at a temperature of about 120° C. and an air pressure of about 20 psi from the gaseous pressure source 403.

Elastomeric Material 102 —Example 3

15 parts of a polyester polyol such as Baytec GSV 85A (which is a 2,000-molecular-weight polyethylene/polybutylene adipate diol) having a hydroxyl number of 55 were premixed with a 6 parts of butane diol at a temperature of about 50° C. To this polyol mixture, 100 parts of a polyester pre-polymer such as Baytec 242 (which is a modified diphenylmethane diisocyanate (MDI)-terminated polyester prepolymer) was added at a temperature of about 50° C. and mixed. The resulting polyurethane reaction mixture 102D was spread onto a foam polyurethane preform 304 that had been previously coated with a layer 302 of Smooth On EZ Spray SILICONE® 20 silicone (which is a 20 Shore A silicone elastomer) and a layer of inner liner 202 made from a polysulfide, such as PRC Rapid Seal 655 aliphatic polysulfide sold by PRC-DeSoto International, Inc. Next, about a 24 oz NYLON fabric 104B that had been previously dried and coated with a solvated polyurethane, namely Estane 5714, an aliphatic polyurethane, or a polyether type thermoplastic polyurethane, was placed on the preform 304.

This was followed by adding another layer of the same polyurethane reaction mixture 102C. Next, a layer of partially vulcanized natural rubber having less than about 1% sulfur, forming sealant layer 106 was applied followed by another layer of the same polyurethane reaction mixture 102B. Subsequently, a layer of polyurethane coated 24 oz NYLON fabric 104A and a final layer of the same polyurethane reaction mixture 102A were applied.

The resulting "wet" composite of intermediate fuel tank 300 was rotated and turned until the polyurethane reaction mixture layers 102 cooled to yield a tacky but intractable coating. At this stage, the fuel tank was placed in one half of a three dimensional mold 400. The second half 400A of the mold was closed onto the first half 400B and the fuel tank 300A, 300B was cured for at least about 90.0 minutes at a temperature of about 120° C. and an air pressure of about 20 psi from the gaseous pressure source 403.

Elastomeric Material 102 —Example 4

39 parts of a polyester polyol such as Baytec GSV 85A (which is a 2,000-molecular-weight polyethylene/polybutylene adipate diol) having a hydroxyl number of 55 were premixed with a 4 parts of butane diol and 1.4 parts of an Alkoxylated trimethylolpropanesuch as Curene 93 (which is an ethoxylated trimethylol propane with a hydroxyl number of 610) at a temperature of about 50° C. To this polyol mixture, 100 parts of a polyester pre-polymer such as Baytec 242 (which is a modified diphenylmethane diisocyanate (MDI)-terminated polyester prepolymer) were added at a temperature of about 50° C. and mixed.

The resulting polyurethane reaction mixture 102D was spread onto a foam polyurethane preform 304 that had been previously coated with a layer 302 of Smooth On EZ Spray SILICONE® 20 silicone (which is a 20 Shore A silicone elastomer) and a layer of inner liner 202 made from a polysulfide such as PRC Rapid Seal 655 aliphatic polysulfide sold by PRC-DeSoto International, Inc. Next, about a 24 oz NYLON fabric 104B that had been previously dried and coated with a solvated polyurethane, namely Estane 5714, an aliphatic polyurethane, or a polyether type thermoplastic polyurethane, was placed on the preform 304.

This was followed by adding another layer of the same polyurethane reaction mixture 102C. Next, a layer of partially vulcanized natural rubber having about forming sealant layer 106 was applied followed by another layer of the same polyurethane reaction mixture 102B. Subsequently, a layer of polyurethane coated 24 oz NYLON fabric 104A and a final layer of the same polyurethane reaction mixture 102A were applied.

The resulting "wet" composite of intermediate fuel tank 300 was rotated and turned until the polyurethane reaction mixture layers 102 cooled to yield a tacky but intractable coating. At this stage, the fuel tank was placed in one half of a three dimensional clam shell mold 400. The second half 400A of the mold was closed onto the first half 400B and the fuel tank 300A, 300B was cured for at least about 90.0 minutes at a temperature of about 120° C. and an air pressure of about 20 psi from the gaseous pressure source 403.

Elastomeric Material 102 —Example 5

39 parts of a polyester polyol such as Baytec GSV 85A (which is a 2,000-molecular-weight polyethylene/polybutylene adipate diol) having a hydroxyl number of 55 were premixed with a 4 parts of butane diol, 1.4 parts of an ethoxylated trimethylol propane with a hydroxyl number of 610 (available under the tradename Curene 93 by Anderson Development Company of Adrian, Mich.) and 1.3 parts of trimethylolpropane monoallyl ether with a hydroxyl number of 640 at a temperature of about 50° C. To this polyol mixture, 100 parts of a polyester pre-polymer such as Baytec 242 (which is a modified diphenylmethane diisocyanate (MDI)-terminated polyester prepolymer) was added at a temperature of about 50° C. and mixed.

The resulting polyurethane reaction mixture 102D was spread onto a foam polyurethane preform 304 that had been previously coated with a layer 302 of Smooth On EZ Spray SILICONE® 20 silicone (which is a 20 Shore A silicone elastomer) and a layer of inner liner 202 made from a polysulfide, such as PRC Rapid Seal 655 aliphatic polysulfide sold by PRC-DeSoto International, Inc. Next, about a 24 oz NYLON fabric 104B that had been previously dried and coated with a solvated polyurethane, namely Estane 5714, an aliphatic polyurethane, or a polyether type thermoplastic polyurethane, was placed on the preform 304.

This was followed by adding another layer of the same polyurethane reaction mixture 102C. Next, a layer of partially vulcanized natural rubber having about less than 1% sulfur, forming sealant layer 106 was applied followed by another layer of the same polyurethane reaction mixture 102B. Subsequently, a layer of polyurethane coated 24 oz NYLON fabric 104A and a final layer of the same polyurethane reaction mixture 102A were applied.

The resulting "wet" composite of intermediate fuel tank 300 was rotated and turned until the polyurethane reaction mixture layers 102 cooled to yield a tacky but intractable coating. At this stage, the fuel tank was placed in one half of a three dimensional mold 400. The second half 400A of the mold was closed onto the first half 400B and the fuel tank 300A, 300B was cured for at least about 90.0 minutes at a temperature of about 120° C. and an air pressure of about 20 psi from the gaseous pressure source 403.

The measurements below Table 1 listed below show the difference between the system 200/method 500 and a conventional method for forming self-sealing volumes. While the self-sealing volumes formed by the inventive system/ method and the conventional method had different shapes relative to each other, their dimensions demonstrate some significant advantages with the inventive system 200 and method 500. The outer dimensions of each volume have been compared. What this data shows is that there is more dimensional variability in the conventional method for forming a self-sealing volume compared to the inventive system 200 and method 500.

The coefficient of variation (CV), a measure of the extent of variability in relation to mean of the population, is between about 0.35% and about 0.49% for the conventional method. Meanwhile, it's between about 0.072% and about 0.080% for the inventive method 500 and system 200. Comparing this data, this is an improvement of between at least five to about six times (500-600%) with the invention. It is believed that the inflation of the wall system 200 via inflation of the mold release layer 302 against the mold 400 is at least one element which contributes to this improvement dimensional stability over the conventional art.

As noted previously, at least one inventive aspect of the inventive system and method is that the preform 304 is inflated during cure of the elastomeric material included in layer 100. With this inflation of the preform 304, the wall system 200 conforms to the exact dimensions of the mold 400 which holds the preform 304 and the wall system 200 sandwiched there between. This process yields a dimensionally correct/precisely built self-sealing volume 200.

TABLE 1

CONVENTIONAL SELF SEALING VOLUME VS. INVENTIVE SELF-SEALING VOLUME

| | CONVENTIONAL SELF-SEALING VOLUME | | | | SELF-SEALING VOLUME OF INVENTIVE SYSTEM 200 AND METHOD 500 | | | |
|---|---|---|---|---|---|---|---|---|
| Measurement | Date Measured | VOLUME ID | Measurement 1 Width 2" from end | Measurement 2 Width 5" from end | Date Measured | VOLUME ID | Measurement 1 Width 2" from end | Measurement 2 Width 5" from end |
| 1 | Sep. 10, 2012 | 1. | 17.59 | 17.48 | Sep. 19, 2012 | 23. | 19.76 | 19.78 |
| 2 | Sep. 10, 2012 | 2. | 17.59 | 17.53 | Sep. 19, 2012 | 24. | 19.8 | 19.82 |
| 3 | Sep. 10, 2012 | 3. | 17.57 | 17.6 | Sep. 19, 2012 | 25. | 19.8 | 19.81 |
| 4 | Sep. 10, 2012 | 4. | 17.52 | 17.58 | Sep. 19, 2012 | 26. | 19.79 | 19.78 |
| 5 | Sep. 10, 2012 | 5. | 17.58 | 17.5 | Sep. 19, 2012 | 27. | 19.77 | 19.79 |
| 6 | Sep. 10, 2012 | 6. | 17.61 | 17.6 | Sep. 19, 2012 | 28. | 19.8 | 19.8 |
| 7 | Sep. 19, 2012 | 7. | 17.67 | 17.54 | Sep. 19, 2012 | 29. | 19.78 | 19.79 |
| 8 | Sep. 19, 2012 | 8. | 17.65 | 17.38 | Sep. 19, 2012 | 30. | 19.78 | 19.75 |
| 9 | Sep. 19, 2012 | 9. | 17.59 | 17.4 | Sep. 19, 2012 | 31. | 19.79 | 19.8 |
| 10 | Sep. 19, 2012 | 10. | 17.57 | 17.41 | Sep. 19, 2012 | 32. | 19.8 | 19.81 |
| 11 | Sep. 19, 2012 | 11. | 17.58 | 17.6 | Sep. 19, 2012 | 33. | 19.8 | 19.79 |
| 12 | Sep. 19, 2012 | 12. | 17.62 | 17.49 | Sep. 19, 2012 | 34. | 19.78 | 19.8 |
| 13 | Sep. 20, 2012 | 13. | 17.59 | 17.46 | Sep. 19, 2012 | 35. | 19.81 | 19.8 |
| 14 | Sep. 20, 2012 | 14. | 17.7 | 17.5 | Sep. 19, 2012 | 36. | 19.8 | 19.79 |
| 15 | Sep. 20, 2012 | 15. | 17.61 | 17.49 | Sep. 19, 2012 | 37. | 19.8 | 19.8 |
| 16 | Sep. 20, 2012 | 16. | 17.67 | 17.61 | Sep. 19, 2012 | 38. | 19.81 | 19.8 |
| 17 | Sep. 20, 2012 | 17. | 17.51 | 17.59 | | | | |
| 18 | Sep. 20, 2012 | 18. | 17.45 | 17.39 | | | | |
| 19 | Sep. 20, 2012 | 19. | 17.66 | 17.48 | | | | |
| 20 | Sep. 20, 2012 | 20. | 17.55 | 17.37 | | | | |
| 21 | Sep. 20, 2012 | 21. | 17.66 | 17.39 | | | | |
| 22 | Sep. 20, 2012 | 22. | 17.68 | 17.35 | | | | |
| Average | | | 17.60 | 17.49 | | | 19.79 | 19.79 |
| Std Dev | | | 0.061 | 0.086 | | | 0.014 | 0.016 |
| % CV | | | 0.35% | 0.49% | | | 0.072% | 0.080% |

Certain steps in the processes or process flows described in this specification naturally precede others for the invention to function as described. However, the invention is not limited to the order of the steps described if such order or sequence does not alter the functionality of the invention. That is, it is recognized that some steps may preformed before, after, or parallel (substantially simultaneously with) other steps without departing from the scope and spirit of the invention.

For example, in an alternative exemplary embodiment, the urethane reaction mixture 102 may be applied according to the following sequence: to the inner liner 202, similar to step 525; then, the reaction mixture 102 may be applied to the fabric layer 104; then the fabric layer 104 may then be applied to the inner liner 202, similar to step 525; then the reaction mixture 102 may be applied to the fabric layer 104 again; then, the sealant layer 106 may be applied, similar to step 545; and then, the reaction mixture 102 may be applied to a second fabric layer 104.

In some instances, certain steps may be omitted or not preformed without departing from the invention. Further, words such as "thereafter", "then", "next", etc. are not intended to limit the order of the steps. These words are simply used to guide the reader through the description of the exemplary method.

According to an additional exemplary embodiment, a first barrier layer (not illustrated) may be provided between the liner 202 and the sealant 106. The purpose of the barrier layer is to limit the permeation of fuel 204 over time through the inner liner layer 202, the elastomeric material layer 102D, the fabric layer 104B, and the elastomeric material layer 102C. A second barrier layer, like the first barrier layer (both not illustrated) may also be provided on the exterior of the self-sealing volume 200 to also limit fuel permeation from fuel 204 that may come in contact with the volume 200, such as through a spill or leak from another volume or source.

Although selected aspects have been illustrated and described in detail, it will be understood that various substitutions and alterations may be made therein without departing from the spirit and scope of the present invention, as defined by the following claims.

What is claimed is:

1. A method for making a self-sealing volume, the method comprising:
    coating an inflatable preform with a material for forming the self-sealing volume and for forming one or more passages that allow for the escape of a fluid, the material comprising an elastomeric material;

placing the preform having the material into a mold;
inflating the material against the mold with the fluid;
allowing the fluid to escape through the one or more passages; and
curing the material with the mold to form the self-sealing volume, wherein the material comprises on or more layers of fabrics, each fabric having a weight between about 4.0 oz/square yard to about 36.0 oz/square yard; wherein the material further comprises at least one of polyurethanes, polyureas, polyurethane ureas, epoxy, polyester, and silicones.

2. The method of claim 1, wherein the material comprises cords, each cord having diameter of between about 0.0624 of an inch to about 0.25 an inch.

3. The method of claim 1, wherein each fabric is made from at least one of nylon, polyester, polypropylene, polyethylene and an aramid.

4. The method of claim 1, wherein the material comprises at least one of a sealant calendared onto a fabric and a sealant calendared between two layers of fabric.

5. The method of claim 1, wherein the one or more passages are positioned in at least one of a corner of the self-sealing volume, and a side of the self-sealing volume.

6. A method for making a self-sealing volume, the method comprising:
coating an inflatable preform with a material for forming the self-sealing volume and for forming one or more passages that allow for the escape of a fluid, the material comprising an elastomeric material;
placing the preform having the material into a mold;
inflating the material against the mold with the fluid;
allowing the fluid to escape through the one or more passages; and
curing the material with the mold to form the self-sealing volume, wherein the material comprises at least one of a sealant calendared onto a fabric and a sealant calendared between two layers of fabric; wherein the material comprises at least one of polyurethanes, polyureas, polyurethane ureas, epoxy, polyester, and silicones.

7. The method of claim 6, wherein the material comprises cords, each cord having diameter of between about 0.0624 of an inch to about 0.25 an inch.

8. The method of claim 6, wherein the material comprises on or more layers of fabrics, each fabric having a weight between about 4.0 oz/square yard to about 36.0 oz/square yard.

9. The method of claim 6, wherein the material comprises fabrics made from at least one of nylon, polyester, polypropylene, polyethylene and an aramid.

10. The method of claim 6, wherein the one or more passages are positioned in at least one of a corner of the self-sealing volume, and a side of the self-sealing volume.

11. A method for making a self-sealing volume, the method comprising:
coating an inflatable preform with a material for forming the self-sealing volume and for forming one or more passages that allow for the escape of a fluid, the material comprising an elastomeric material;
placing the preform having the material into a mold;
inflating the material against the mold with the fluid;
allowing the fluid to escape through the one or more passages; and
curing the material with the mold to form the self-sealing volume, wherein the one or more passages are positioned in at least one of a corner of the self-sealing volume, and a side of the self-sealing volume; wherein the material comprises at least one of polyurethanes, polyureas, polyurethane ureas, epoxy, polyester, and silicones.

12. The method of claim 11, wherein the material comprises cords, each cord having diameter of between about 0.0624 of an inch to about 0.25 an inch.

13. The method of claim 11, wherein the material comprises on or more layers of fabrics, each fabric having a weight between about 4.0 oz/square yard to about 36.0 oz/square yard.

14. The method of claim 11, wherein the material comprises fabrics made from at least one of nylon, polyester, polypropylene, polyethylene and an aramid.

15. The method of claim 11, wherein the material comprises at least one of a sealant calendared onto a fabric and a sealant calendared between two layers of fabric.

16. The method of claim 1, wherein the material comprises on or more layers of fabrics, each fabric having a weight between about 4.0 oz/square yard to about 36.0 oz/square yard.

17. The method of claim 16, wherein the material comprises fabrics made from at least one of nylon, polyester, polypropylene, polyethylene and an aramid.

18. The method of claim 17, wherein the material comprises at least one of a sealant calendared onto a fabric and a sealant calendared between two layers of fabric.

19. The method of claim 14, wherein the material comprises on or more layers of fabrics, each fabric having a weight between about 4.0 oz/square yard to about 36.0 oz/square yard.

20. The method of claim 19, wherein the material comprises fabrics made from at least one of nylon, polyester, polypropylene, polyethylene and an aramid.

* * * * *